US012712763B2

(12) United States Patent
Liu

(10) Patent No.: US 12,712,763 B2
(45) Date of Patent: Aug. 18, 2026

(54) JOINT CHANNEL ESTIMATION METHOD AND APPARATUS THEREFOR

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 301 days.

(21) Appl. No.: 18/571,566

(22) PCT Filed: Jun. 22, 2021

(86) PCT No.: PCT/CN2021/101655

§ 371 (c)(1),
(2) Date: Dec. 18, 2023

(87) PCT Pub. No.: WO2022/266862

PCT Pub. Date: Dec. 29, 2022

(65) Prior Publication Data

US 2024/0291689 A1 Aug. 29, 2024

(51) Int. Cl.

*H04L 25/02* (2006.01)
*H04L 27/26* (2006.01)
*H04W 24/10* (2009.01)

(52) U.S. Cl.

CPC ...... *H04L 25/0202* (2013.01); *H04L 27/2671* (2013.01); *H04W 24/10* (2013.01)

(58) Field of Classification Search

CPC ............. H04L 25/0202; H04L 27/2671; H04L 25/0204; H04L 25/0224; H04L 5/00; H04L 25/00; H04W 24/10; H04W 72/00
See application file for complete search history.

(56) References Cited

U.S. PATENT DOCUMENTS

2021/0075571 A1 3/2021 Manolakos et al.
2023/0199735 A1* 6/2023 Li ........................ H04L 1/1671 370/336
2023/0362900 A1* 11/2023 Wang ........................ H04L 1/08
2024/0023076 A1* 1/2024 Cui ..................... H04L 25/0202

FOREIGN PATENT DOCUMENTS

CN 106685498 A 5/2017
CN 109428624 A 3/2019
CN 110351054 A 10/2019
CN 111050406 A 4/2020
(Continued)

OTHER PUBLICATIONS

"Discussion on Joint channel estimation for PUSCH," Proceedings of the 3GPP TSG RAN WG1 #104b-e, Vivo, R1-2102536, Apr. 12, 2021, e-Meeting, 13 pages.
(Continued)

*Primary Examiner* — Yaotang Wang
(74) *Attorney, Agent, or Firm* — McCoy Russell LLP

(57) ABSTRACT

A joint channel estimation method includes: determining a maximum duration length of a terminal device, and determining a reporting strategy for the maximum duration length; determining an actual time domain window length according to the reporting strategy and the maximum duration length; and performing joint channel estimation processing according to the actual time domain window length.

11 Claims, 9 Drawing Sheets

(56) References Cited

FOREIGN PATENT DOCUMENTS

| IN | 202027048089 A | 1/2021 |
|---|---|---|
| WO | 2021007239 A1 | 1/2021 |

OTHER PUBLICATIONS

"Joint channel estimation for PUSCH," Proceedings of the 3GPP TSG RAN WG1 #104b-e, Xiaomo, R1-2102994, Apr. 12, 2021, e-Meeting, 7 pages.

"Discussion on joint channel estimation for PUSCH," Proceedings of the 3GPP TSG RAN WG1 #105-e, ZTE Corporation, R1-2104332, May 10, 2021, e-Meeting, 11 pages.

"Discussion on joint channel estimation for PUSCH," Proceedings of the 3GPP TSG RAN WG1 #105-e, CMCC, R1-2104627, May 10, 2021, e-Meeting, 8 pages.

"Joint channel estimation for PUSCH," Proceedings of the 3GPP TSG RAN WG1 #105-e, Xiaomi, R1-2105577, May 10, 2021, e-Meeting, 5 pages.

"[105-e-NR-R17-CovEnh-03] Summary of email discussion on joint channel estimation for PUSCH," Proceedings of the 3GPP TSG RAN WG1 Meeting #105-e, Moderator (China Telecom), R1-2106152, May 10, 2021, 105 pages.

"Discussion on joint channel estimation for PUSCH," Proceedings of the 3GPP TSG RAN WG1 #104bis-e, China Telecom, R1-2102862, Apr. 12, 2021, e-Meeting, 7 pages.

* cited by examiner

JOINT CHANNEL ESTIMATION METHOD AND APPARATUS THEREFOR

CROSS REFERENCE TO RELATED APPLICATION

The present application is a U.S. National Phase of International Application No. PCT/CN2021/101655 entitled "JOINT CHANNEL ESTIMATION METHOD AND APPARATUS THEREFOR," and filed on Jun. 22, 2021. The entire contents of the above-listed application are hereby incorporated by reference for all purposes.

BACKGROUND

In the related art, a coverage enhancement (CE) topic joint channel estimation solution in R17 introduces a concept of a time domain window. Within the same time domain window length, a terminal device needs to maintain power consistency and phase consistency.

SUMMARY

The disclosure relates to the technical field of wireless communication, in particular to a joint channel estimation method and an apparatus therefor.

An example of a first aspect of the disclosure provides a joint channel estimation method. The method is executed by a terminal device and includes: determining a maximum duration length of the terminal device; determining a reporting strategy for the maximum duration length; determining an actual time domain window length according to the reporting strategy and the maximum duration length; and performing joint channel estimation processing according to the actual time domain window length.

An example of a second aspect of the disclosure provides another joint channel estimation method. The method is executed by a network device and includes: determining configuration information for a terminal device; and issuing the configuration information to the terminal device.

An example of a third aspect of the disclosure provides a joint channel estimation apparatus, applied to a terminal device and including: a processing unit, configured to determine a maximum duration length of the terminal device and determine a reporting strategy for the maximum duration length, where the processing unit is further configured to determine an actual time domain window length according to the reporting strategy and the maximum duration length; and the processing unit is further configured to perform joint channel estimation processing according to the actual time domain window length.

An example of a fourth aspect of the disclosure provides another joint channel estimation apparatus, applied to a network device and including: a processing unit, configured to determine configuration information for a terminal device; and a transceiving unit, configured to issue the configuration information to the terminal device.

An example of a fifth aspect of the disclosure provides a communication device, including: a transceiver; a memory; and a processor, connected with the transceiver and the memory respectively, and configured to control wireless signal receiving and sending of the transceiver by executing computer executable instructions stored on the memory, so as to implement the following steps: determining a maximum duration length of the communication device; determining a reporting strategy for the maximum duration length; determining an actual time domain window length according to the reporting strategy and the maximum duration length; and performing joint channel estimation processing according to the actual time domain window length.

An example of a sixth aspect of the disclosure provides another communication device, including: a transceiver; a memory; and a processor, connected with the transceiver and the memory respectively, and configured to control wireless signal receiving and sending of the transceiver by executing computer executable instructions stored on the memory, so as to implement the joint channel estimation method provided by the example of the second aspect of the disclosure.

An example of a seventh aspect of the disclosure provides a communication apparatus, including: a processor and an interface circuit, the interface circuit is configured to receive code instructions and transmit the code instructions to the processor; and the processor is configured to run the code instructions to execute the joint channel estimation method provided by the example of the first aspect of the disclosure.

An example of an eighth aspect of the disclosure provides another communication apparatus, including: a processor and an interface circuit, the interface circuit is configured to receive code instructions and transmit the code instructions to the processor; and the processor is configured to run the code instructions to execute the joint channel estimation method provided by the example of the second aspect of the disclosure.

An example of a ninth aspect of the disclosure provides a non-transitory computer storage medium, and the non-transitory computer storage medium stores computer executable instructions; and the computer executable instructions, after being executed by a processor, can implement the joint channel estimation method provided by the example of the first aspect of the disclosure.

An example of a tenth aspect of the disclosure provides a non-transitory computer storage medium, and the non-transitory computer storage medium stores computer executable instructions; and the computer executable instructions, after being executed by a processor, can implement the joint channel estimation method provided by the example of the second aspect of the disclosure.

An example of an eleventh aspect of the disclosure provides a computer program product, including a computer program, where the computer program, when executed by a processor, implements the joint channel estimation method provided by the example of the first aspect of the disclosure.

An example of a twelfth aspect of the disclosure provides a computer program product, including a computer program, where the computer program, when executed by a processor, implements the joint channel estimation method provided by the example of the second aspect of the disclosure.

The additional aspects and strengths of the disclosure will be partially provided in the following description, and some will become apparent from the following description or learned through the practice of the disclosure.

BRIEF DESCRIPTION OF THE DRAWINGS

The above and/or additional aspects and strengths of the disclosure will become apparent and easy to understand from the description of examples with reference to the accompanying drawings, where.

DETAILED DESCRIPTION

Figure 1:
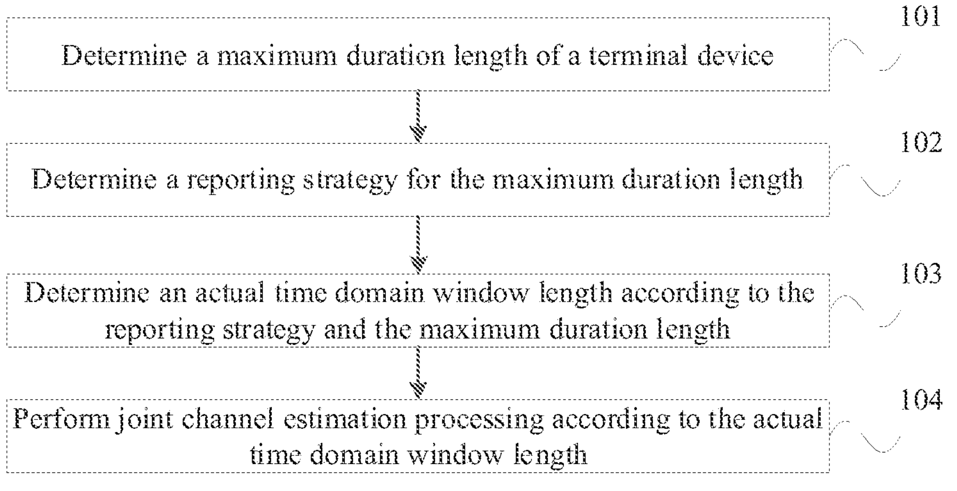
FIG. 1 is a schematic flow diagram of a joint channel estimation method provided by an example of the disclosure.

In addition, a maximum duration length of the terminal device will further be introduced to characterize the maximum duration length that the terminal device can maintain the power consistency and the phase consistency. For the terminal device, a time domain window length needs to be less than or equal to the maximum duration length. The time domain window length depends on network configuration and base station scheduling, while the maximum duration length depends on terminal capabilities. How to report the maximum duration length and determine impact of the maximum duration length on the time domain window length are problems that this patent aims to solve.

Examples will be illustrated in detail here, and instances of which are represented in the accompanying drawings. When the following description refers to the accompanying drawings, the same number in the different accompanying drawings represents the same or similar elements unless otherwise indicated. The implementations described in the following examples do not represent all implementations consistent with the examples of the disclosure. On the contrary, they are examples of an apparatus and method consistent with some aspects of the examples of the disclosure as detailed in the appended claims.

The terms used in the examples of the disclosure are for the purpose of describing the particular examples, and are not intended to limit the examples of the disclosure. The singular forms “a” and “the” used in the examples and the appended claims of the disclosure are intended to include the plural forms as well, unless the context clearly indicates otherwise. It is to be further understood that the term “and/or” used here refers to and contains any and all possible combinations of one or more associated listed items.

It is to be understood that the terms “first”, “second”, “third” and the like may be employed in the examples of the disclosure to describe various pieces of information, but these pieces of information should not be limited to these terms. These terms are used to distinguish the same type of information from one another. For example, in a case of not departing from the scope of the examples of the disclosure, first information may also be called second information, and similarly, the second information may also be called the first information. Depending on the context, the word “if” and “in case” as used here may be interpreted as “at the time of” or “when” or “in response to determining”.

Examples of the disclosure are described below in detail. Examples of the examples are shown in the accompanying drawings. The same or similar reference numbers represent the same or similar elements from beginning to end. The examples described below with reference to the accompanying drawings are examples, aim to explain the disclosure, and cannot be understood as limitation to the disclosure.

A joint channel estimation method and an apparatus therefor provided by the disclosure mainly solve the following problems:

first, whether a maximum duration length is reported by a terminal device and how to report the maximum duration length;

second, a relationship between the maximum duration length and a time domain window length, and whether and how to determine the time domain window length based on the maximum duration length; and third, whether a signaling process for reporting the maximum duration length and the time domain window length is to configure the time domain window length first or report the maximum duration length first.

The joint channel estimation method and an apparatus therefor of the examples of the disclosure are described below with reference to the accompanying drawings.

FIG. 1 is a schematic flow diagram of a joint channel estimation method provided by an example of the disclosure. The joint channel estimation method may be executed by a terminal device.

The terminal device may refer to a device that provides voice and/or data connectivity to a user, a handheld device with a wireless connection function, or other processing devices connected to a wireless modem. In different systems, the terminal device may also have different names. For example, in a 5G system, the terminal device may be called user equipment (UE). A wireless terminal device may communicate with one or more core networks (CNs) via an RAN, and the wireless terminal device may be a mobile terminal device, such as a mobile phone (or called a "cellular" phone) and a computer with the mobile terminal device, for example, the wireless terminal device may be portable, pocket-sized, handheld, computer-built or vehicle-mounted mobile apparatus, which exchanges language and/or data with the radio access network.

For example, the terminal device may be a personal communication service (PCS) phone, a cordless phone, a session initiated protocol (SIP) phone, a wireless local loop (WLL) station, a personal digital assistant (PDA), and other devices. The wireless terminal device may also be referred to as a system, a subscriber unit, a subscriber station, a mobile station, a mobile, a remote station, an access point, a remote terminal, an access terminal, a user terminal, a user agent, and a user device, which is not limited in the examples of the disclosure.

As shown in FIG. 1, the joint channel estimation method may include the following steps:

step 101, a maximum duration length of a terminal device is determined.

In the example of the disclosure, the maximum duration length refers to a maximum duration length that the terminal device maintains power consistency and phase consistency.

In the example of the disclosure, the terminal device may detect its corresponding maximum duration length.

Step 102, a reporting strategy for the maximum duration length is determined.

In the example of the disclosure, the reporting strategy for the maximum duration length may include that the terminal device does not report the maximum duration length, and the terminal device reports the maximum duration length, where reporting the maximum duration length may include that the terminal device periodically reports the maximum duration length, and the terminal device aperiodically reports the maximum duration length.

Step 103, an actual time domain window length is determined according to the reporting strategy and the maximum duration length.

In the example of the disclosure, the actual time domain window length refers to a time domain window length actually used by the terminal device during joint channel estimation processing. It is to be understood that the actual time domain window length is less than or equal to the maximum duration length.

In the example of the disclosure, the terminal device may determine the actual time domain window length according to the reporting strategy and the maximum duration length.

Step 104, joint channel estimation processing is performed according to the actual time domain window length.

In the example of the disclosure, the terminal device may perform joint channel estimation processing according to the actual time domain window length after determining the actual time domain window length.

The joint channel estimation method provided by the example of the disclosure determines the maximum duration length of the terminal device, determines the reporting strategy for the maximum duration length, determines the actual time domain window length according to the reporting strategy and the maximum duration length, and performs joint channel estimation processing according to the actual time domain window length. The actual time domain window length may be determined according to the maximum duration length of the terminal device and the reporting strategy, so that the terminal device may perform joint channel estimation processing according to the actual time domain window length.

It is to be noted that these above possible implementations may be executed separately or together, which is not limited in the example of the disclosure.

Figure 2:
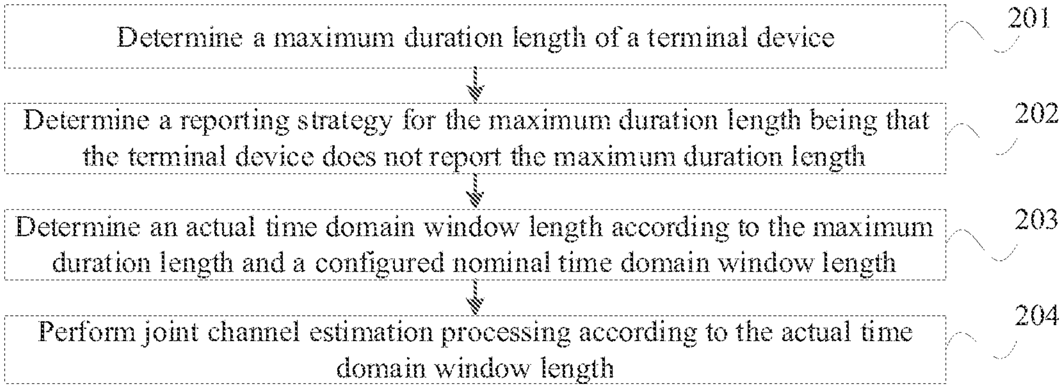
FIG. 2 is a schematic flow diagram of another joint channel estimation method provided by an example of the disclosure.

An example of the disclosure provides another joint channel estimation method. FIG. 2 is a schematic flow diagram of another joint channel estimation method provided by the example of the disclosure. The joint channel estimation method may be executed by a terminal device. The joint channel estimation method may be executed separately, or together with any example in the disclosure or possible implementations in the example, or together with any technical solution in the related art.

As shown in FIG. 2, the joint channel estimation method may include the following steps:

step 201, a maximum duration length of a terminal device is determined.

In the example of the disclosure, step 201 may be implemented in any mode of the examples in the disclosure, which is not limited in the example of the disclosure and is not repeated.

Step 202, a reporting strategy for the maximum duration length is determined to be that the terminal device does not report the maximum duration length.

Step 203, an actual time domain window length is determined according to the maximum duration length and a configured nominal time domain window length.

In the example of the disclosure, the nominal time domain window length is a configured time domain window length.

In a possible implementation of the example of the disclosure, the nominal time domain window length may be displayed and configured by a network device.

The network device takes a base station as an example. The base station may include a plurality of cells that provide services for user equipment (UE). Depending on the specific application scenarios, each cell may also contain a plurality of transmission reception points or transmit receive points (TRPs). Each TRP may contain one or more antenna panels, or may be a device in an access network that communicates with a wireless terminal device through one or more sectors on an air interface, or other names. For example, the base station involved in the example of the disclosure may be a base transceiver station (BTS) in a global system for mobile communications (GSM) or code division multiple access (CDMA), or a base station (NodeB) in wide-band code division multiple access, and may also be an evolutional Node B (eNB or e-NodeB for short) in a long term evolution (LTE) system, a 5G base station (gNB for short) in a 5G network architecture (next generation system), or a home evolved Node B (HeNB), a relay node, a home base station (femto), a femto base station (pico), etc., which is not limited in the example of the disclosure.

As an example, the network device may configure the nominal time domain window length through radio resource control (RRC) configuration information.

As another example, the network device may configure the nominal time domain window length through a medium access control-control element (MAC-CE).

As a yet another example, the network device may configure the nominal time domain window length through downlink control information (DCI).

It needs to be noted that the above shows an example of the network device configuring the nominal time domain window length through one type of signaling. In practical applications, the nominal time domain window length may further be configured in a mode of combining a plurality of signalings, which is not limited in the disclosure. For example, the nominal time domain window length may be configured in a mode of combining any two of the three signalings above, or the nominal time domain window length may further be configured through the three signalings above.

In another possible implementation of the example of the disclosure, the nominal time domain window length may further be obtained according to a protocol.

As an example, the time domain window length agreed by the protocol is estimated to be M, that is, the time domain window length agreed by the protocol is M.

In another possible implementation of the example of the disclosure, the nominal time domain window length may further be obtained implicitly.

As an example, the time domain window length may be implicitly determined through a ratio of upstream and downstream frame structures, that is, the nominal time domain window length may be implicitly determined through the ratio of the upstream and downstream frame structures.

In the example of the disclosure, the actual time domain window length may be determined according to the maximum duration length and the configured nominal time domain window length.

It is to be understood that the actual time domain window length needs to be less than or equal to the maximum duration length. Thus, in the example of the disclosure, the configured nominal time domain window length may be compared with the maximum duration length. In response to determining that the configured nominal time domain window length is less than or equal to the maximum duration length, the nominal time domain window length may be taken as the actual time domain window length. In response to determining that the configured nominal time domain window length is greater than the maximum duration length, the maximum duration length may be taken as the actual time domain window length.

Step 204, joint channel estimation processing is performed according to the actual time domain window length.

In the example of the disclosure, step 204 may be implemented in any mode of the examples in the disclosure, which is not limited in the example of the disclosure and is not repeated.

Figure 3:
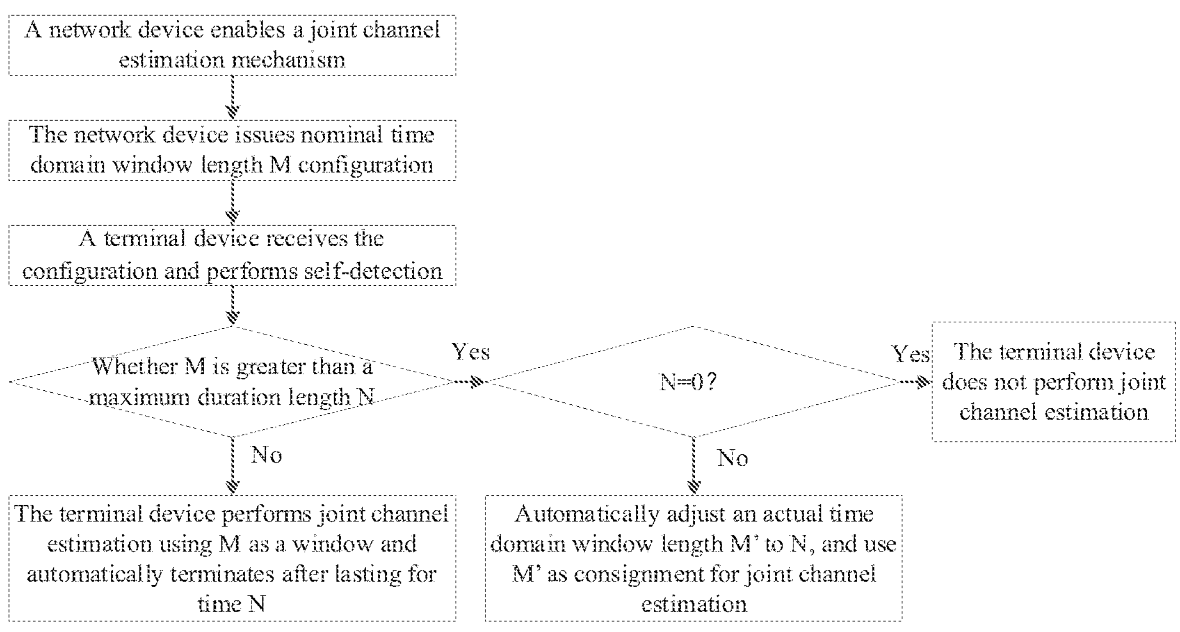
FIG. 3 is a schematic flow diagram of another joint channel estimation method provided by an example of the disclosure.

Illustration is made by taking an example that the nominal time domain window length is configured by the network device. As shown in FIG. 3, the network device may enable a joint channel estimation mechanism. That is, the network device may send joint channel estimation enabling information and configure the nominal time domain window length to be M. After the terminal device receives the joint channel estimation enabling information and the nominal time domain window length M sent by the network device, the terminal device may self-check its corresponding maximum duration length N. If the terminal device determines that MSN, the terminal device may perform joint channel estimation with M as a window length. If the terminal device determines that M>N, the terminal device may automatically adjust the actual time domain window length M'=N, and performs joint channel estimation with M' as the window length.

It needs to be noted that the above shows an example that a triggering mode of joint channel estimation being display triggering (that is, the network device sends the joint channel estimation enabling information), where display triggering refers to being indicated by specialized signalings and bits. In practical applications, the triggering mode of joint channel estimation may also be implicit triggering. For example, in response to determining that network device merely issues the nominal time domain window length, joint channel estimation is triggered by default. Alternatively, the network device triggers joint channel estimation when receiving the maximum duration length reported by the terminal device, or the network device triggers joint channel estimation by default when certain protocol predefined rules are met.

The joint channel estimation method provided by the example of the disclosure determines the reporting strategy for the maximum duration length being that the terminal device does not report the maximum duration length, determines the actual time domain window length according to the maximum duration length and the configured nominal time domain window length, and performs joint channel estimation processing according to the actual time domain window length. In a case that the terminal device does not report the maximum duration length, the actual time domain window length may be determined according to the maximum duration length of the terminal device and the configured nominal time domain window length, so that the terminal device may perform joint channel estimation processing according to the actual time domain window length.

It is to be noted that these above possible implementations may be executed separately or together, which is not limited in the example of the disclosure.

Figure 4:
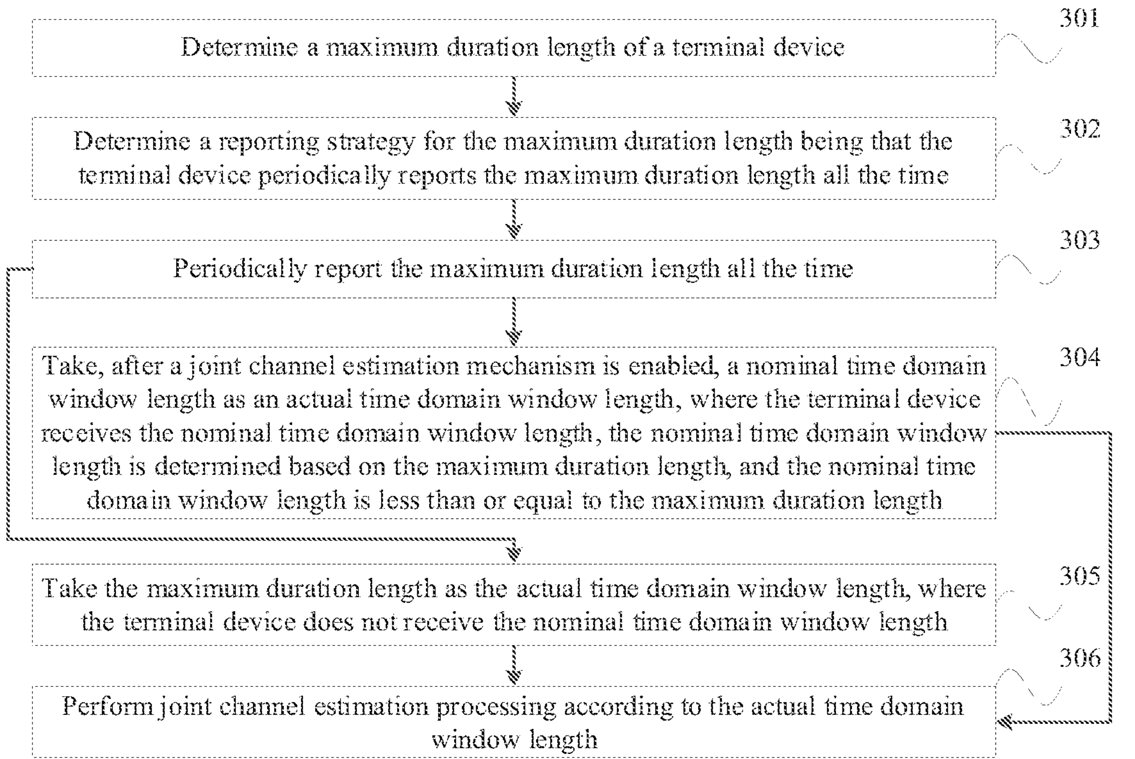
FIG. 4 is a schematic flow diagram of another joint channel estimation method provided by an example of the disclosure.

An example of the disclosure provides another joint channel estimation method. FIG. 4 is a schematic flow diagram of another joint channel estimation method provided by the example of the disclosure. The joint channel estimation method may be executed by a terminal device. The joint channel estimation method may be executed separately, or together with any example in the disclosure or possible implementations in the example, or together with any technical solution in the related art.

As shown in FIG. 4, the joint channel estimation method may include the following steps:

step 301, a maximum duration length of a terminal device is determined.

In the example of the disclosure, step 301 may be implemented in any mode of the examples in the disclosure, which is not limited in the example of the disclosure and is not repeated.

Step 302, a reporting strategy for the maximum duration length is determined to be that the terminal device periodically reports the maximum duration length all the time.

Step 303, the maximum duration length is periodically reported all the time.

In the example of the disclosure, the terminal device may periodically report its corresponding maximum duration length all the time.

Step 304, after a joint channel estimation mechanism is enabled, a nominal time domain window length is taken as an actual time domain window length, where the terminal device receives the nominal time domain window length, the nominal time domain window length is determined based on the maximum duration length, and the nominal time domain window length is less than or equal to the maximum duration length.

In the example of the disclosure, a network device may configure the nominal time domain window length according to the maximum duration length, and the nominal time domain window length configured by the network device needs to be less than or equal to the maximum duration length. The network device may send the configured nominal time domain window length to the terminal device, for example, the network device may configure the nominal time domain window length through an RRC, an MAC-CE, or DCI.

In the example of the disclosure, after the joint channel estimation mechanism is enabled, if the terminal device receives the nominal time domain window length, the terminal device may take the nominal time domain window length as the actual time domain window length.

Step 305, the maximum duration length is taken as the actual time domain window length, where the terminal device does not receive the nominal time domain window length.

In the example of the disclosure, in a case of not receiving the nominal time domain window length sent by the network device, the terminal device may take the maximum duration length as the actual time domain window length.

Step 306, joint channel estimation processing is performed according to the actual time domain window length.

In the example of the disclosure, step 306 may be implemented in any mode of the examples in the disclosure, which is not limited in the example of the disclosure and is not repeated.

As an application scenario, regardless of whether the network device triggers joint channel estimation or not, the terminal device periodically reports the maximum duration length.

Figure 5:
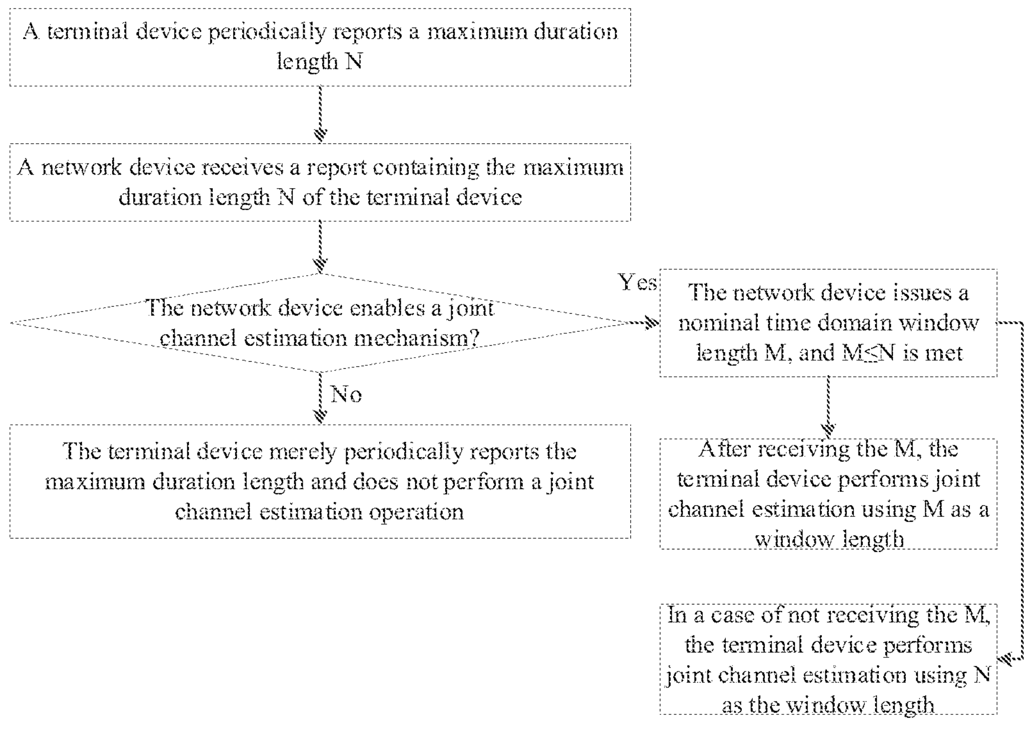
FIG. 5 is a schematic flow diagram of another joint channel estimation method provided by an example of the disclosure.

As shown in FIG. 5, the terminal device may periodically report the maximum duration length N all the time, and after receiving the maximum duration length N reported by the terminal device, the network device may determine whether to enable the joint channel estimation mechanism (that is, determine whether to trigger the joint channel estimation). If the network device enables the joint channel estimation mechanism and issues time domain window configuration, after receiving the nominal time domain window length M issued by the network device, the terminal device may perform joint channel estimation using M as a window length. However, if the terminal device does not receive the nominal time domain window length issued by the network device, the actual time domain window length implicitly obtained by the terminal device is N, and joint channel estimation is performed by taking N as the window length.

The joint channel estimation method provided by the example of the disclosure periodically reports the maximum duration length all the time by determining the reporting strategy for the maximum duration length being that the terminal device periodically reports the maximum duration length all the time; takes the nominal time domain window length as the actual time domain window length after the joint channel estimation mechanism is enabled, where the terminal device receives the nominal time domain window length; or takes the maximum duration length as the actual time domain window length, where the terminal device does not receive the nominal time domain window length; and performs joint channel estimation processing according to the actual time domain window length. In the case where the terminal device periodically reports the maximum duration length all the time, the terminal device may perform joint channel estimation processing according to the received nominal time domain window length, or in a case of not receiving the nominal time domain window length, the terminal device may perform joint channel estimation processing according to the maximum duration length.

It is to be noted that these above possible implementations may be executed separately or together, which is not limited in the example of the disclosure.

Figure 6:
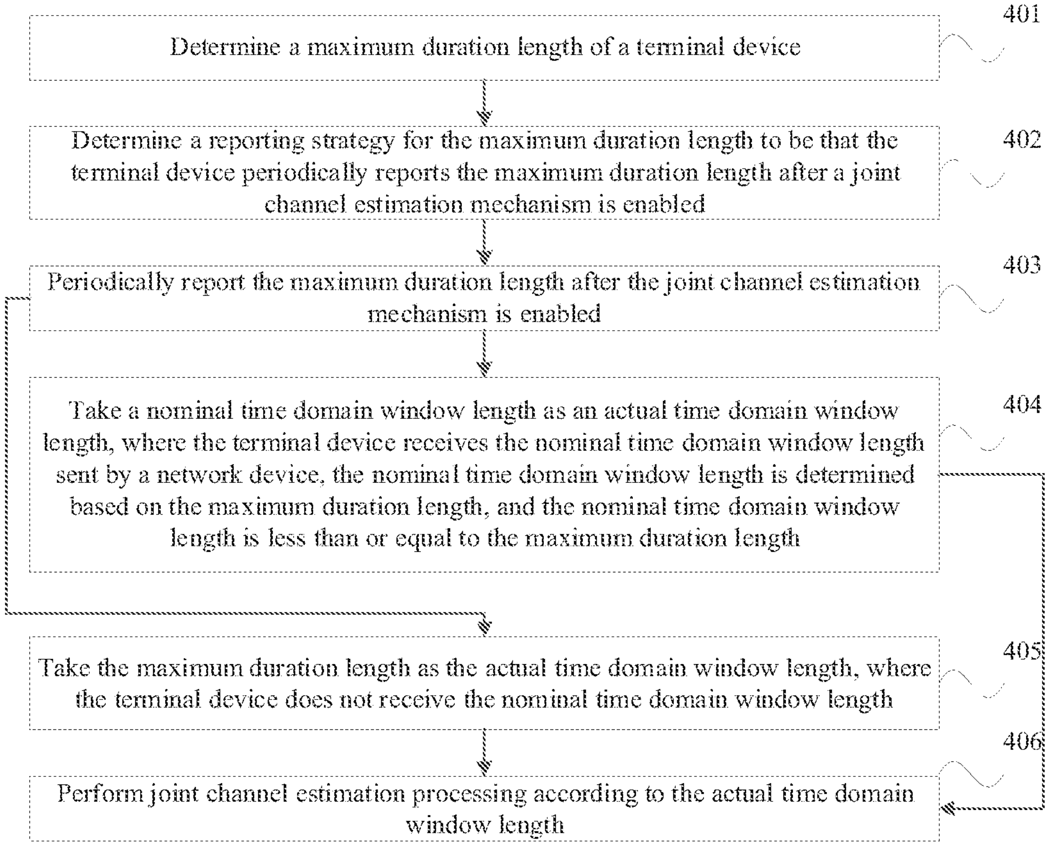
FIG. 6 is a schematic flow diagram of another joint channel estimation method provided by an example of the disclosure.

An example of the disclosure provides another joint channel estimation method. FIG. 6 is a schematic flow diagram of another joint channel estimation method provided by the example of the disclosure. The joint channel estimation method may be executed by a terminal device. The joint channel estimation method may be executed separately, or together with any example in the disclosure or possible implementations in the example, or together with any technical solution in the related art.

As shown in FIG. 6, the joint channel estimation method may include the following steps:

step 401, a maximum duration length of a terminal device is determined.

In the example of the disclosure, step 401 may be implemented in any mode of the examples in the disclosure, which is not limited in the example of the disclosure and is not repeated.

Step 402, a reporting strategy for the maximum duration length is determined to be that the terminal device periodically reports the maximum duration length after a joint channel estimation mechanism is enabled.

In the example of the disclosure, the terminal device may periodically report the maximum duration length after the joint channel estimation mechanism is enabled. That is, the terminal device may periodically report the maximum duration length after a network device enables the joint channel estimation mechanism.

Step 403, the maximum duration length is periodically reported after the joint channel estimation mechanism is enabled.

Step 404, a nominal time domain window length is taken as an actual time domain window length, where the terminal device receives the nominal time domain window length sent by the network device, the nominal time domain window length is determined based on the maximum duration length, and the nominal time domain window length is less than or equal to the maximum duration length.

In the example of the disclosure, in a case of receiving the maximum duration length reported by the terminal device, the network device may configure the nominal time domain window length according to the maximum duration length, where the nominal time domain window length configured by the network device is less than or equal to the maximum duration length. The network device may send the configured nominal time domain window length to the terminal device, for example, the network device may configure the nominal time domain window length through an RRC, an MAC-CE, or DCI.

In the example of the disclosure, after receiving the nominal time domain window length, the terminal device may take the nominal time domain window length as the actual time domain window length.

Step 405, the maximum duration length is taken as the actual time domain window length, where the terminal device does not receive the nominal time domain window length.

In the example of the disclosure, in a case of not receiving the nominal time domain window length sent by the network device, the terminal device may take the maximum duration length as the actual time domain window length.

Step 406, joint channel estimation processing is performed according to the actual time domain window length.

In the example of the disclosure, step 406 may be implemented in any mode of the examples in the disclosure, which is not limited in the example of the disclosure and is not repeated.

As an application scenario, after the network device enables the joint channel estimation mechanism, the terminal device periodically reports the maximum duration length.

Figure 7:
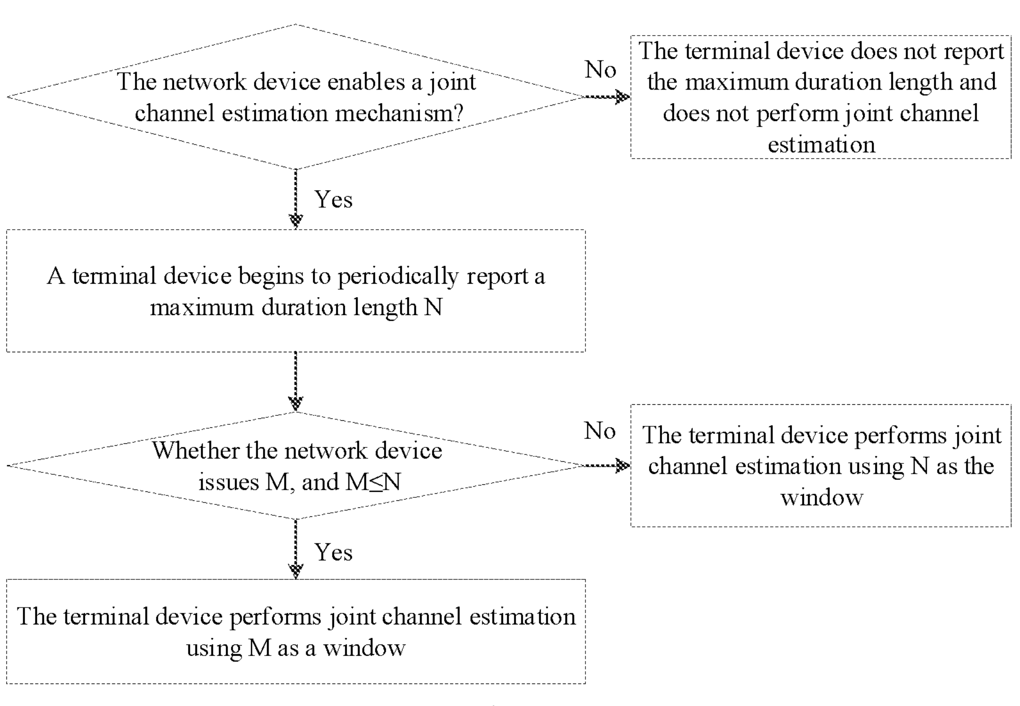
FIG. 7 is a schematic flow diagram of another joint channel estimation method provided by an example of the disclosure.

As shown in FIG. 7, after the network device enables the joint channel estimation mechanism, the terminal device may periodically report the maximum duration length N, and the terminal device may check whether the nominal time domain window length M configured by the network device is received. If yes, joint channel estimation is performed using M as a window length. If not, the actual time domain window length implicitly obtained by the terminal device is N, and the joint channel estimation is performed using N as the window length. If the network device terminates the joint channel estimation, the terminal device stops periodically reporting the maximum duration length.

The joint channel estimation method provided by the example of the disclosure determines the reporting strategy for the maximum duration length being that the terminal device periodically reports the maximum duration length after the joint channel estimation mechanism is enabled; periodically reports the maximum duration length after the joint channel estimation mechanism is enabled; takes the nominal time domain window length as the actual time domain window length, where the terminal device receives the nominal time domain window length; or takes the maximum duration length as the actual time domain window length, where the terminal device does not receive the nominal time domain window length; and performs joint channel estimation processing according to the actual time domain window length. After the joint channel estimation mechanism is enabled, the terminal device may periodically report the maximum duration length and perform joint channel estimation processing according to the received nominal time domain window length, or in the case where the nominal time domain window length is not received, the terminal device may perform joint channel estimation processing according to the maximum duration length.

It is to be noted that these above possible implementations may be executed separately or together, which is not limited in the example of the disclosure.

Figure 8:
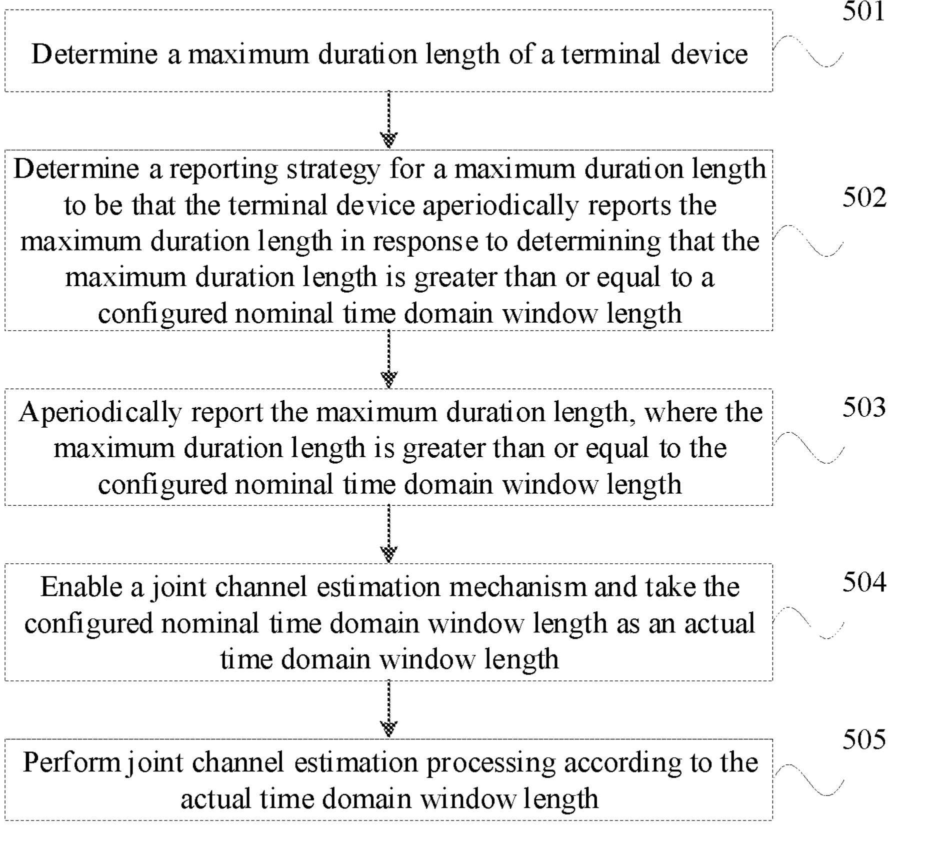
FIG. 8 is a schematic flow diagram of another joint channel estimation method provided by an example of the disclosure.

An example of the disclosure provides another joint channel estimation method. FIG. 8 is a schematic flow diagram of another joint channel estimation method provided by the example of the disclosure. The joint channel estimation method may be executed by a terminal device. The joint channel estimation method may be executed separately, or together with any example in the disclosure or possible implementations in the example, or together with any technical solution in the related art.

As shown in FIG. 8, the joint channel estimation method may include the following steps:

step 501, a maximum duration length of a terminal device is determined.

In the example of the disclosure, step 501 may be implemented in any mode of the examples in the disclosure, which is not limited in the example of the disclosure and is not repeated.

Step 502, a reporting strategy for the maximum duration length is determined to be that the terminal device aperiodically reports the maximum duration length in response to determining that the maximum duration length is greater than or equal to a configured nominal time domain window length.

It is to be noted that the explanation of the nominal time domain window length in the aforementioned example of FIG. 2 is also applicable to this example and will not be repeated here.

In the example of the disclosure, in a case that the maximum duration length of the terminal device is greater than or equal to the configured nominal time domain window length, the terminal device may aperiodically report the maximum duration length.

Step 503, the maximum duration length is aperiodically reported, where the maximum duration length is greater than or equal to the configured nominal time domain window length.

In the example of the present disclosure, the terminal device may compare the configured nominal time domain window length with its own maximum duration length. In a case that the configured nominal time domain window length is greater than its corresponding maximum duration length, the terminal device may not report the maximum duration length or trigger joint channel estimation (that is, not enable a joint channel estimation mechanism). In a case that the configured nominal time domain window length is less than or equal to its own maximum duration length, the terminal device may aperiodically report the maximum duration length.

Step 504, the joint channel estimation mechanism is enabled, and the configured nominal time domain window length is taken as an actual time domain window length.

In the example of the disclosure, in a case of aperiodically reporting the maximum duration length, the terminal device may enable the joint channel estimation mechanism and take the configured nominal time domain window length as the actual time domain window length. That is, in the case of aperiodically reporting the maximum duration length, the terminal device may automatically enable the joint channel estimation without the need for a network device to issue an enabling signaling.

Step 505, joint channel estimation processing is performed according to the actual time domain window length.

In the example of the disclosure, step 505 may be implemented in any mode of the examples in the disclosure, which is not limited in the example of the disclosure and is not repeated.

Figure 9:
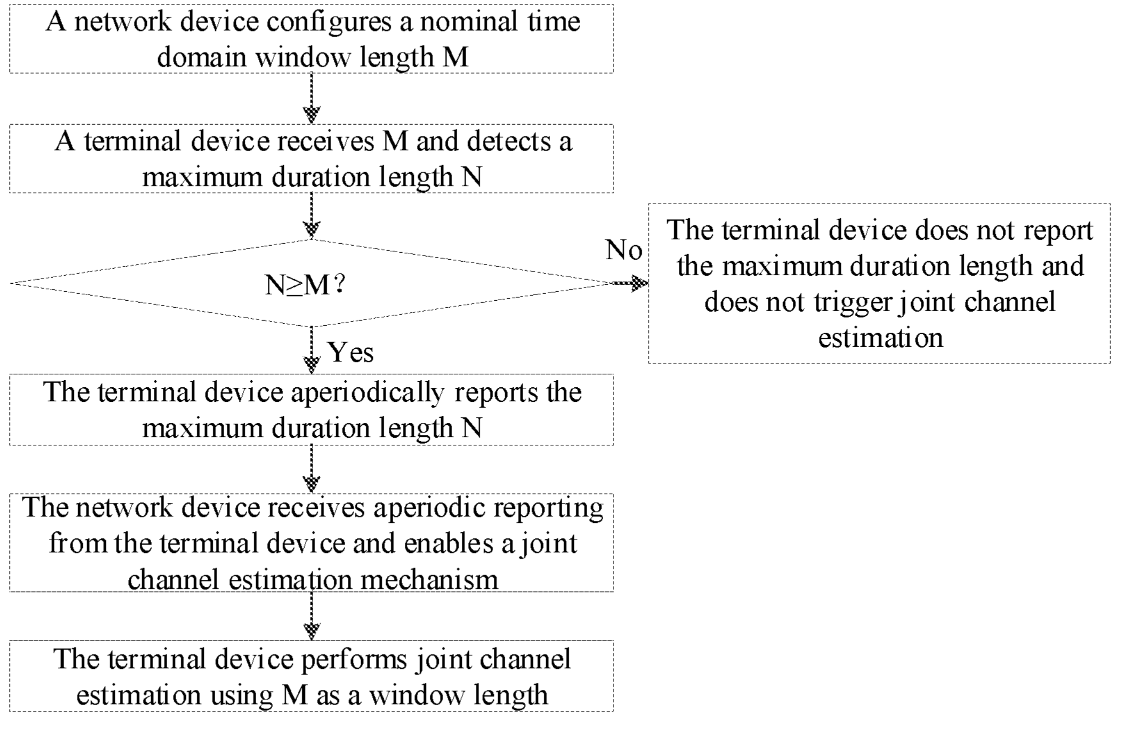
FIG. 9 is a schematic flow diagram of another joint channel estimation method provided by an example of the disclosure.

Illustration is made by taking an example that the nominal time domain window length is configured by the network device. As shown in FIG. 9, the network device may configure the nominal time domain window length M through an RRC, an MAC-CE, or DCI, but does not need to enable the joint channel estimation mechanism. After receiving the nominal time domain window length, the terminal device may detect its corresponding maximum duration length N and judge whether M is less than or equal to N. If MEN, the terminal device aperiodically reports the maximum duration length N, the network device receives the aperiodic reporting and enables the joint channel estimation mechanism, and the terminal device performs joint channel estimation using M as the window length. When the joint channel estimation time length is equal to N, the joint channel estimation mechanism is automatically disabled. If M is greater than N, the terminal device does not report the maximum duration length and does not trigger joint channel estimation.

The joint channel estimation method provided by the example of the disclosure determines the reporting strategy for the maximum duration length being that the terminal device aperiodically reports the maximum duration length in response to determining that the maximum duration length is greater than or equal to the configured nominal time domain window length; aperiodically reports the maximum duration length, where the maximum duration length is greater than or equal to the configured nominal time domain window length; enables the joint channel estimation mechanism, and takes the configured nominal time domain window length as the actual time domain window length; and performs joint channel estimation processing according to the actual time domain window length. In response to determining that the maximum duration length is greater than or equal to the configured nominal time domain window length, the terminal device may aperiodically report the maximum duration length, automatically enables the joint channel estimation mechanism, and performs joint channel estimation processing according to the configured nominal time domain window length.

It is to be noted that these above possible implementations may be executed separately or together, which is not limited in the example of the disclosure.

Figure 10:
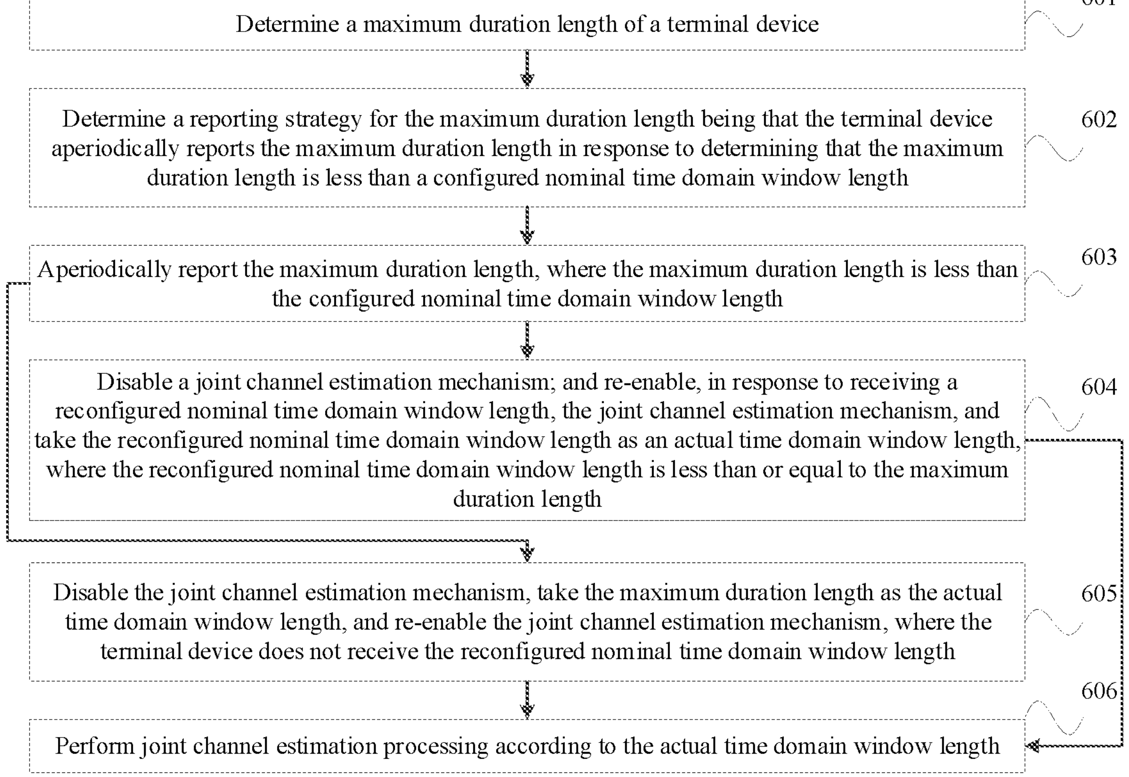
FIG. 10 is a schematic flow diagram of another joint channel estimation method provided by an example of the disclosure.

An example of the disclosure provides another joint channel estimation method. FIG. 10 is a schematic flow diagram of another joint channel estimation method provided by the example of the disclosure. The joint channel estimation method may be executed by a terminal device. The joint channel estimation method may be executed separately, or together with any example in the disclosure or possible implementations in the example, or together with any technical solution in the related art.

As shown in FIG. 10, the joint channel estimation method may include the following steps:

step 601, a maximum duration length of a terminal device is determined.

In the example of the disclosure, step 601 may be implemented in any mode of the examples in the disclosure, which is not limited in the example of the disclosure and is not repeated.

Step 602, a reporting strategy for the maximum duration length is determined to be that the terminal device aperiodically reports the maximum duration length in response to determining that the maximum duration length is less than a configured nominal time domain window length.

It is to be noted that the explanation of the nominal time domain window length in the aforementioned example of FIG. 2 is also applicable to this example and will not be repeated here.

In the example of the disclosure, in a case that the maximum duration length of the terminal device is less than the configured nominal time domain window length, the terminal device may aperiodically reports the maximum duration length.

Step 603, the maximum duration length is aperiodically reported, where the maximum duration length is less than the configured nominal time domain window length.

In the example of the present disclosure, the terminal device may compare the configured nominal time domain window length with its own maximum duration length. In a case that the configured nominal time domain window length is less than or equal to its own maximum duration length, the terminal device may directly perform joint channel estimation processing according to the nominal time domain window length. In a case that the configured nominal time domain window length is greater than its own maximum duration length, the terminal device may aperiodically report the maximum duration length.

Step 604, a joint channel estimation mechanism is disabled; and in response to receiving a reconfigured nominal time domain window length, the joint channel estimation mechanism is re-enabled, and the reconfigured nominal time domain window length is taken as an actual time domain window length, where the reconfigured nominal time domain window length is less than or equal to the maximum duration length.

In the example of the disclosure, after aperiodically reporting the maximum duration length, the terminal device may disable the joint channel estimation mechanism.

In the example of the disclosure, in a case of receiving the maximum duration length reported by the terminal device, a network device may reconfigure the nominal time domain window length according to the maximum duration length so as to obtain the reconfigured nominal time domain window length, where the reconfigured nominal time domain window length is less than or equal to the maximum duration length, and the network device sends the reconfigured nominal time domain window length to the terminal device, for example, the network device may reconfigure the nominal time domain window length through an RRC, an MAC-CE, or DCI.

In the example of the disclosure, after receiving the reconfigured nominal time domain window length, the terminal device may re-enable the joint channel estimation mechanism, and take the reconfigured nominal time domain window length as the actual time domain window length.

Step 605, the joint channel estimation mechanism is disabled, the maximum duration length is taken as the actual time domain window length, and the joint channel estimation mechanism is re-enabled, where the terminal device does not receive the reconfigured nominal time domain window length.

In the example of the disclosure, after aperiodically reporting the maximum duration length, the terminal device may disable the joint channel estimation mechanism.

In the example of the disclosure, in a case of not receiving the reconfigured nominal time domain window length sent by the network device, the terminal device may take the maximum duration length as the actual time domain window length and re-enable the joint channel estimation mechanism.

Step 606, joint channel estimation processing is performed according to the actual time domain window length.

In the example of the disclosure, steps 601 to 602 may be implemented in any mode of the examples in the disclosure respectively, which is not limited in the example of the disclosure and is not repeated.

Figures 11, 12, 13:
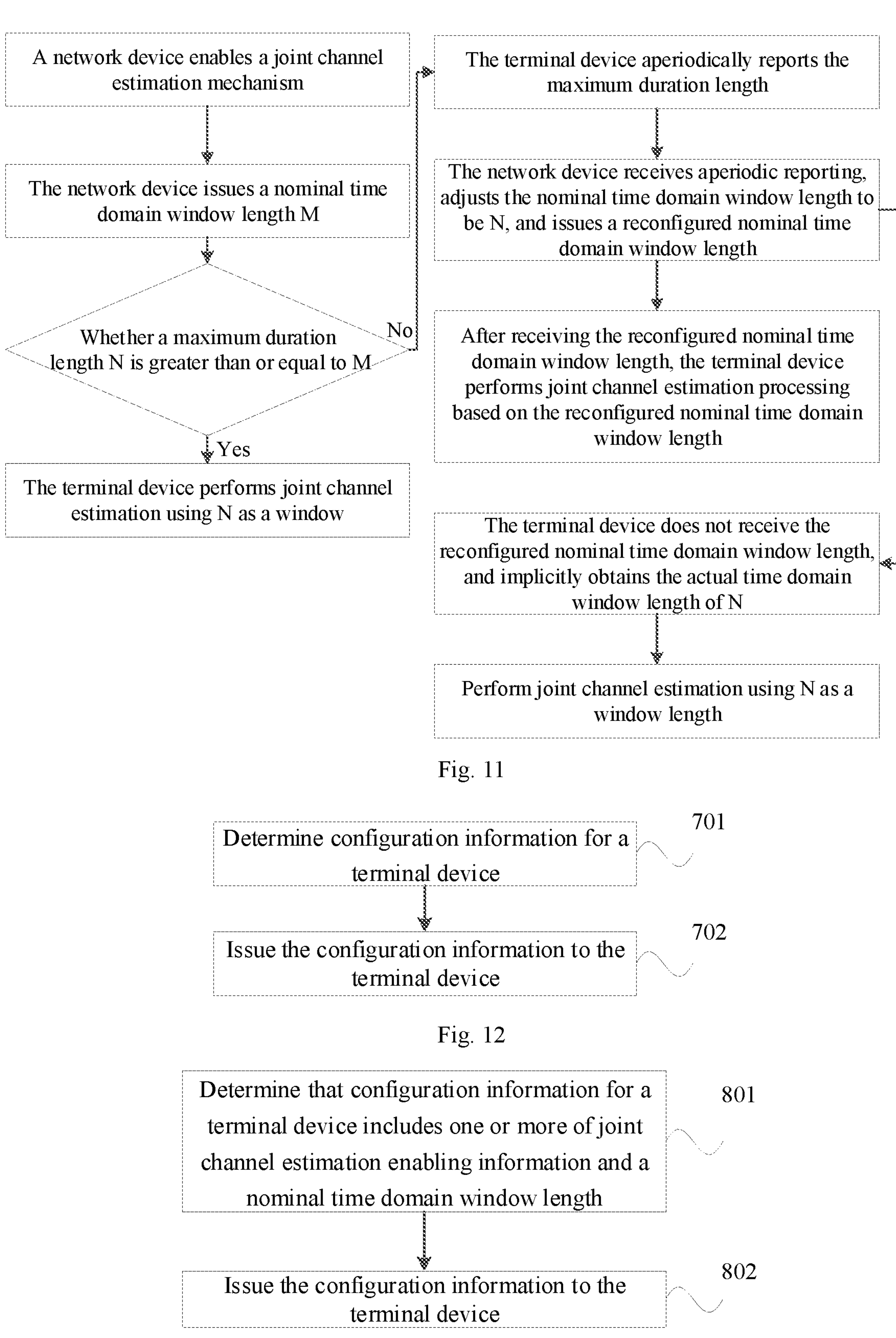
FIG. 11 is a schematic flow diagram of another joint channel estimation method provided by an example of the disclosure.
FIG. 12 is a schematic flow diagram of another joint channel estimation method provided by an example of the disclosure.
FIG. 13 is a schematic flow diagram of another joint channel estimation method provided by an example of the disclosure.

Illustration is made by taking an example that the nominal time domain window length is configured by the network device. As shown in FIG. 11, the network device may enable the joint channel estimation mechanism and issue the nominal time domain window length M. After receiving M, the terminal device may detect its corresponding maximum duration length N. If $N \geq M$, the terminal device directly performs joint channel estimation using M as a window length. If $N < M$, the terminal device performs aperiodic reporting, and reports the maximum duration length N to the network device. After receiving N, the network device adjusts the nominal time domain window length to be N and issues the reconfigured nominal time domain window length. In a case of receiving the reconfigured nominal time domain window length, the terminal device may perform joint channel estimation processing with the reconfigured nominal time domain window length. In a case of not receiving the reconfigured nominal time domain window length, the terminal device may implicitly obtain the actual time domain window length of N, and perform joint channel estimation using N as the window length.

The joint channel estimation method provided by the example of the disclosure determines the reporting strategy for the maximum duration length being that the terminal device aperiodically reports the maximum duration length in response to determining that the maximum duration length is less than the configured nominal time domain window length; aperiodically reports the maximum duration length, where the maximum duration length is less than the configured nominal time domain window length; disables the joint channel estimation mechanism; re-enables the joint channel estimation mechanism in response to receiving the reconfigured nominal time domain window length, and takes the reconfigured nominal time domain window length as the actual time domain window length; disables the joint channel estimation mechanism, takes the maximum duration length as the actual time domain window length and re-enables the joint channel estimation mechanism, where the terminal device does not receive the reconfigured nominal time domain window length; and performs joint channel estimation processing according to the actual time domain window length. In response to determining that the maximum duration length is less than the configured nominal time domain window length, the terminal device may periodically report the maximum duration length and perform joint channel estimation processing according to the received reconfigured nominal time domain window length, or in a case of not receiving the reconfigured nominal time domain window length, the terminal device may perform joint channel estimation processing according to the maximum duration length.

It is to be noted that these above possible implementations may be executed separately or together, which is not limited in the example of the disclosure.

An example of the disclosure provides another joint channel estimation method. FIG. 12 is a schematic flow diagram of another joint channel estimation method provided by the example of the disclosure. The joint channel estimation method may be executed by a network device. The joint channel estimation method may be executed separately, or together with any example in the disclosure or possible implementations in the example, or together with any technical solution in the related art.

As shown in FIG. 12, the joint channel estimation method may include the following steps:

step 701, configuration information for a terminal device is determined.

In the example of the disclosure, the configuration information for the terminal device may include at least one of joint channel estimation enabling information or a nominal time domain window length. The nominal time domain window length is used for determining an actual time domain window length.

Step 702, the configuration information is issued to the terminal device.

In the example of the disclosure, the network device may issue the configuration information to the terminal device, so that the terminal device may determine the actual time domain window length according to the configuration information and its corresponding maximum duration length, and may perform joint channel estimation processing according to the actual time domain window length.

It is to be noted that the explanation of the joint channel estimation method executed on a terminal device side in any of the examples in FIG. 1 to FIG. 11 is also applied to the joint channel estimation method executed on a network device side in this example. The implementation principle is similar and will not be repeated here.

According to the joint channel estimation method in the example of the disclosure, the network device determines the configuration information for the terminal device and issues the configuration information to the terminal device, so that the terminal device may determine the actual time domain window length according to the configuration information and its corresponding maximum duration length, and may perform joint channel estimation processing according to the actual time domain window length.

It is to be noted that these above possible implementations may be executed separately or together, which is not limited in the example of the disclosure.

An example of the disclosure provides another joint channel estimation method. FIG. 13 is a schematic flow diagram of another joint channel estimation method provided by the example of the disclosure. The joint channel estimation method may be executed by a network device. The joint channel estimation method may be executed separately, or together with any example in the disclosure or possible implementations in the example, or together with any technical solution in the related art.

As shown in FIG. 13, the joint channel estimation method may include the following steps:

step 801, it is determined that configuration information for a terminal device includes one or more of joint channel estimation enabling information and a nominal time domain window length.

A reporting strategy for the terminal device to report a maximum duration length is that the terminal device does not report the maximum duration length.

Step 802, the configuration information is issued to the terminal device.

In a possible implementation of the example of the disclosure, in a case that the reporting strategy for the terminal device to report the maximum duration length is not to report the maximum duration length, the configuration information may include joint channel estimation enabling information. At this point, the nominal time domain window length M may be agreed by a protocol or implicitly obtained. After receiving the joint channel estimation enabling information sent by the network device, the terminal device may determine an actual time domain window length M' according to the nominal time domain window length M and the maximum duration length N detected by itself. For example, when MSN, M'=M, and when M>N, M'=N, so that the terminal device may perform joint channel estimation processing according to the actual time domain window length M'.

In another possible implementation of the example of the disclosure, in a case that the reporting strategy for the terminal device to report the maximum duration length is not to report the maximum duration length, the configuration information may include the nominal time domain window length. In response to determining that the network device issues the nominal time domain window length, joint channel estimation may be triggered by default (that is, a joint channel estimation mechanism is enabled), so that the terminal device may determine the actual time domain window length M' according to the nominal time domain window length M issued by the network device and the maximum duration length N detected by itself. For example, when M≤N, M'=M, and when M>N, M'=N, so that the terminal device may perform joint channel estimation processing according to the actual time domain window length M'.

In yet another possible implementation of the example of the disclosure, in a case that the reporting strategy for the terminal device to report the maximum duration length is not to report the maximum duration length, the configuration information may include joint channel estimation enabling information and the nominal time domain window length. After the terminal device receives the joint channel estimation enabling information issued by the network device and the nominal time domain window length M, the terminal device may determine the actual time domain window length M' according to the maximum duration length N detected by itself and the nominal time domain window length M. For example, when MEN, M'=M, and when M>N, M'=N, so that the terminal device may perform joint channel estimation processing according to the actual time domain window length M'.

According to the joint channel estimation method of the example of the disclosure, the network device determines that the configuration information for the terminal device includes one or more of the joint channel estimation enabling information and the nominal time domain window length, where the reporting strategy for the terminal device to report the maximum duration length is not to report the maximum duration length, and the network device issues the configuration information to the terminal device. The terminal device may determine the actual time domain window length according to the configuration information and its corresponding maximum duration length, and may perform joint channel estimation processing according to the actual time domain window length.

It is to be noted that these above possible implementations may be executed separately or together, which is not limited in the example of the disclosure.

Figure 14:
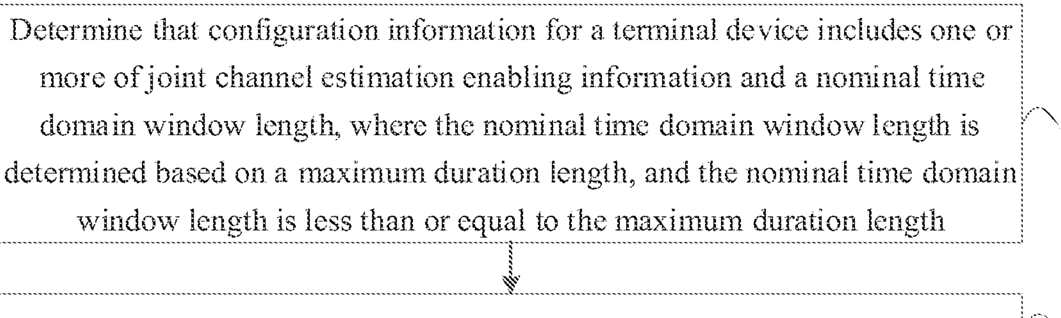
FIG. 14 is a schematic flow diagram of another joint channel estimation method provided by an example of the disclosure.

An example of the disclosure provides another joint channel estimation method. FIG. 14 is a schematic flow diagram of another joint channel estimation method provided by the example of the disclosure. The joint channel estimation method may be executed by a network device. The joint channel estimation method may be executed separately, or together with any example in the disclosure or possible implementations in the example, or together with any technical solution in the related art.

As shown in FIG. 14, the joint channel estimation method may include the following steps:

step 901, it is determined that configuration information for a terminal device includes one or more of joint channel estimation enabling information and a nominal time domain window length, where the nominal time domain window length is determined based on a maximum duration length, and the nominal time domain window length is less than or equal to the maximum duration length.

A reporting strategy for the terminal device to report the maximum duration length is to periodically report the maximum duration length all the time.

Step 902, the configuration information is issued to the terminal device.

In a possible implementation of the example of the disclosure, in a case that the reporting strategy for the terminal device to report the maximum duration length is to periodically report the maximum duration length all the time, the configuration information may include joint channel estimation enabling information, and the nominal time domain window length may be contained in the configuration information or not contained in the configuration information, which is not limited in the disclosure. The nominal time domain window length is determined based on the maximum duration length, and the nominal time domain window length is less than or equal to the maximum duration length.

In response to determining that the configuration information issued by the network device does not include the nominal time domain window length, the terminal device does not receive the nominal time domain window length, but merely receives the joint channel estimation enabling information. At this time, the terminal device may take the maximum duration length as an actual time domain window length and perform joint channel estimation processing according to the actual time domain window length. In response to determining that the configuration information simultaneously includes the joint channel estimation enabling information and the nominal time domain window length, the configuration information issued by the network device and received by the terminal device includes the joint channel estimation enabling information and the nominal time domain window length M, and the terminal device may take the nominal time domain window length as the actual time domain window length and perform joint channel estimation processing according to the actual time domain window length.

According to the joint channel estimation method of the example of the disclosure, the network device determines that the configuration information for the terminal device includes one or more of the joint channel estimation enabling information and the nominal time domain window length, where the nominal time domain window length is determined based on the maximum duration length, and the nominal time domain window length is less than or equal to the maximum duration length; and the reporting strategy for the terminal device to report the maximum duration length is to periodically report the maximum duration length all the time, and the network device issues the configuration information to the terminal device, so that the terminal device may determine the actual time domain window length according to the configuration information and its corresponding maximum duration length, and may perform joint channel estimation processing according to the actual time domain window length.

It is to be noted that these above possible implementations may be executed separately or together, which is not limited in the example of the disclosure.

Figure 15:
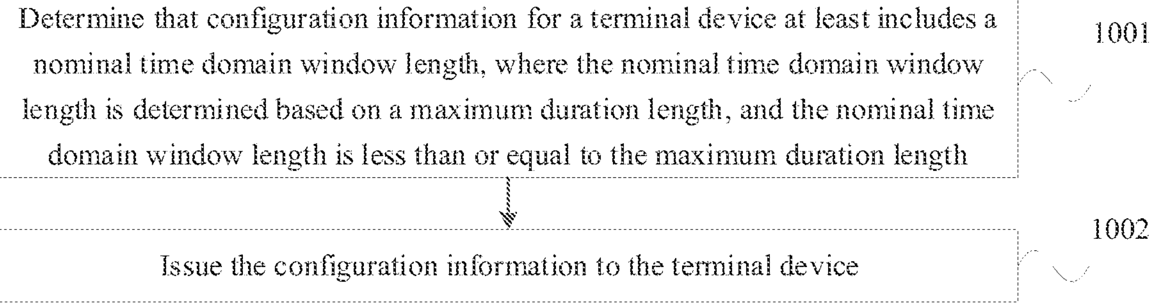
FIG. 15 is a schematic flow diagram of another joint channel estimation method provided by an example of the disclosure.

An example of the disclosure provides another joint channel estimation method. FIG. 15 is a schematic flow diagram of another joint channel estimation method provided by the example of the disclosure. The joint channel estimation method may be executed by a network device. The joint channel estimation method may be executed separately, or together with any example in the disclosure or possible implementations in the example, or together with any technical solution in the related art.

As shown in FIG. 15, the joint channel estimation method may include the following steps:

step 1001, it is determined that configuration information for a terminal device at least includes a nominal time domain window length, where the nominal time domain window length is determined based on a maximum duration length, and the nominal time domain window length is less than or equal to the maximum duration length.

A reporting strategy for the terminal device to report the maximum duration length is that the terminal device periodically reports the maximum duration length after a joint channel estimation mechanism is enabled.

Step 1002, the configuration information is issued to the terminal device.

In the example of the disclosure, the terminal device may periodically report the maximum duration length after the joint channel estimation mechanism is enabled. That is, the terminal device may periodically report the maximum duration length after the network device triggers the joint channel estimation.

In the example of the disclosure, in a case of receiving the maximum duration length reported by the terminal device, the network device may configure the nominal time domain window length according to the maximum duration length, where the nominal time domain window length configured by the network device needs to be less than or equal to the maximum duration length. The network device may issue the configuration information to the terminal device, where the configuration information at least includes joint channel estimation enabling information, for example, the configuration information may further include the nominal time domain window length. This, in a case that the configuration information received by the terminal device includes the nominal time domain window length, the nominal time domain window length may be taken as an actual time domain window length. In a case that the received configuration information does not include the nominal time domain window length, that is, the nominal time domain window length is not received, the corresponding maximum duration length may be taken as the actual time domain window length, so that the terminal device may perform joint channel estimation processing according to the actual time domain window length.

According to the joint channel estimation method of the example of the disclosure, the network device determines that the configuration information for the terminal device at least includes the joint channel estimation enabling information and may further include the nominal time domain window length, where the nominal time domain window length is determined based on the maximum duration length, and the nominal time domain window length is less than or equal to the maximum duration length; and the reporting strategy for the terminal device to report the maximum duration length is that the terminal device periodically reports the maximum duration length after the joint channel estimation mechanism is enabled, and the network device issues the configuration information to the terminal device. The terminal device may determine the actual time domain window length according to the configuration information and its corresponding maximum duration length, and may perform joint channel estimation processing according to the actual time domain window length.

It is to be noted that these above possible implementations may be executed separately or together, which is not limited in the example of the disclosure.

Figure 16:
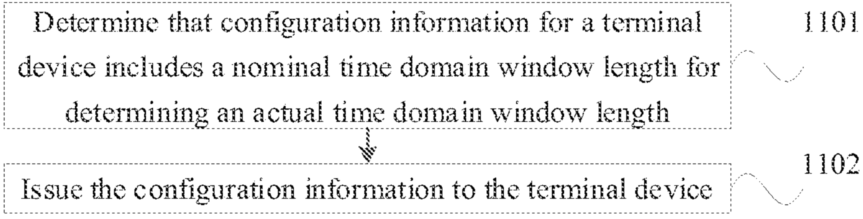
FIG. 16 is a schematic flow diagram of another joint channel estimation method provided by an example of the disclosure.

An example of the disclosure provides another joint channel estimation method. FIG. 16 is a schematic flow diagram of another joint channel estimation method provided by the example of the disclosure. The joint channel estimation method may be executed by a network device. The joint channel estimation method may be executed separately, or together with any example in the disclosure or possible implementations in the example, or together with any technical solution in the related art.

As shown in FIG. 16, the joint channel estimation method may include the following steps:

step 1101, it is determined that configuration information for a terminal device includes a nominal time domain window length for determining an actual time domain window length.

A reporting strategy for the terminal device to report a maximum duration length is to aperiodically report the maximum duration length based on a condition that the maximum duration length is greater than or equal to the nominal time domain window length.

Step 1102, the configuration information is issued to the terminal device.

In the example of the disclosure, the configuration information issued by the network device to the terminal device may include the nominal time domain window length. After receiving the configuration information, if the terminal device determines that its corresponding maximum duration length is greater than or equal to the nominal time domain window length in the configuration information, the terminal device may aperiodically report the maximum duration length, enables a joint channel estimation mechanism, takes the nominal time domain window length configured by the network device as the actual time domain window length, and performs joint channel estimation processing according to the actual time domain window length.

According to the joint channel estimation method of the example of the disclosure, the network device determines that the configuration information for the terminal device includes the nominal time domain window length for determining the actual time domain window length, where the reporting strategy for the terminal device to report the maximum duration length is to aperiodically report the maximum duration length based on the condition that the maximum duration length is greater than or equal to the nominal time domain window length, and the network device issues the configuration information to the terminal device. The terminal device may determine the actual time domain window length according to the configuration information and its corresponding maximum duration length, and may perform joint channel estimation processing according to the actual time domain window length.

It is to be noted that these above possible implementations may be executed separately or together, which is not limited in the example of the disclosure.

Figure 17:
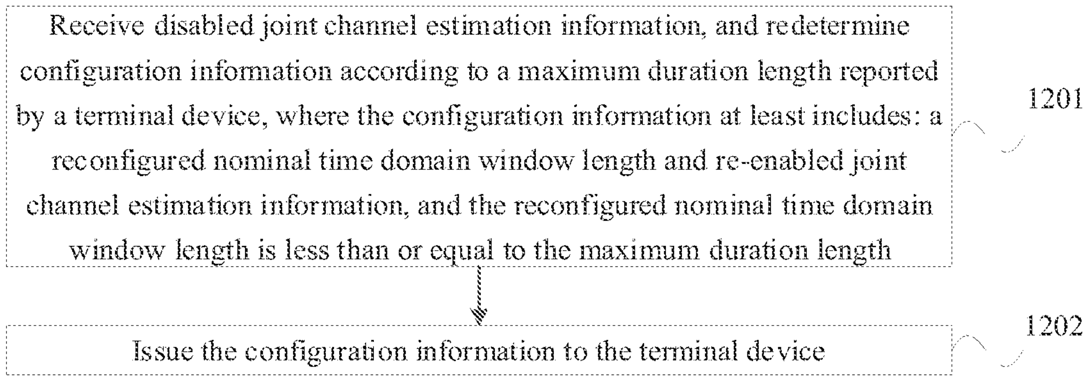
FIG. 17 is a schematic flow diagram of another joint channel estimation method provided by an example of the disclosure.

An example of the disclosure provides another joint channel estimation method. FIG. 17 is a schematic flow diagram of another joint channel estimation method provided by the example of the disclosure. The joint channel estimation method may be executed by a network device. The joint channel estimation method may be executed separately, or together with any example in the disclosure or possible implementations in the example, or together with any technical solution in the related art.

As shown in FIG. 17, the joint channel estimation method may include the following steps:

step 1201, disabled joint channel estimation information is received, and configuration information is redetermined according to a maximum duration length reported by a terminal device, where the configuration information at least includes: a reconfigured nominal time domain window length and re-enabled joint channel estimation information, and the reconfigured nominal time domain window length is less than or equal to the maximum duration length.

A reporting strategy for the terminal device to report the maximum duration length is to aperiodically report the maximum duration length based on a condition that the maximum duration length is less than the configured nominal time domain window length.

Step 1202, the configuration information is issued to the terminal device.

In the example of the disclosure, the terminal device may compare the configured nominal time domain window length with its own maximum duration length. In a case that the configured nominal time domain window length is less than or equal to its own maximum duration length, the terminal device may directly perform joint channel estimation processing according to the nominal time domain window length. In a case that the configured nominal time domain window length is greater than its own maximum duration length, the terminal device may aperiodically report the maximum duration length. The nominal time domain window length configured above may be configured by the network device, or may be agreed by a protocol or implicitly obtained, which is not limited in the disclosure.

In the example of the disclosure, after aperiodically reporting the maximum duration length, the terminal device may disable the joint channel estimation mechanism. In a case of receiving the maximum duration length reported by the terminal device, the network device may reconfigure the nominal time domain window length according to the maximum duration length so as to obtain the reconfigured nominal time domain window length, where the reconfigured nominal time domain window length needs to be less than or equal to the maximum duration length. The network device may issue the configuration information to the terminal device. The configuration information at least includes the reconfigured nominal time domain window length and re-enabled joint channel estimation information. Correspondingly, after receiving the configuration information, the terminal device may re-enable a joint channel estimation mechanism and take the reconfigured nominal time domain window length in the configuration information as an actual time domain window length, so that the terminal device may perform joint channel estimation processing according to the actual time domain window length. In a case of not receiving the configuration information sent by the network device, the terminal device may take the maximum duration length as the actual time domain window length, re-enable the joint channel estimation mechanism, and perform joint channel estimation processing according to the actual time domain window length.

According to the joint channel estimation method of the example of the disclosure, the network device redetermines the configuration information according to the maximum duration length reported by the terminal device in response to receiving the disabled joint channel estimation enabling information, where the configuration information at least includes: the reconfigured nominal time domain window length and the re-enabled joint channel estimation enabling information; the reconfigured nominal time domain window length is less than or equal to the maximum duration length; and the reporting strategy for the terminal device to report the maximum duration length is to aperiodically report the maximum duration length based on the condition that the maximum duration length is less than the configured nominal time domain window length, and the network device issues reconfigured information to the terminal device. The terminal device may determine the actual time domain window length according to the configuration information redetermined by the network device and its corresponding maximum duration length, and may perform joint channel estimation processing according to the actual time domain window length.

It is to be noted that these above possible implementations may be executed separately or together, which is not limited in the example of the disclosure.

Corresponding to the joint channel estimation methods provided by the examples from FIG. 1 to FIG. 11 above, the disclosure further provides a joint channel estimation apparatus. Because the joint channel estimation apparatus provided by the example of the disclosure corresponds to the joint channel estimation methods provided by the examples from FIG. 1 to FIG. 11 above, the implementation of the joint channel estimation methods is also applicable to the joint channel estimation apparatus provided by the example of the disclosure, which will not be described in detail in the example of the disclosure.

Figure 18:
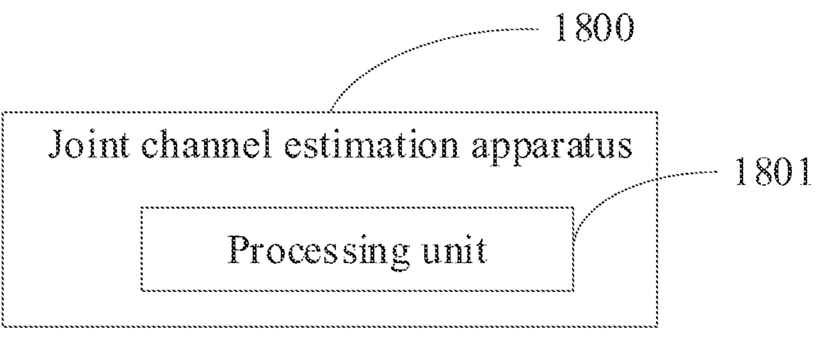
FIG. 18 is a schematic structural diagram of a joint channel estimation apparatus provided by an example of the disclosure.

FIG. 18 is a schematic structural diagram of a joint channel estimation apparatus provided by an example of the disclosure. The apparatus may be applied into a terminal device.

As shown in FIG. 18, the joint channel estimation apparatus 1800 may include: a processing unit 1801.

The processing unit 1801 is configured to determine a maximum duration length of the terminal device and determine a reporting strategy for the maximum duration length.

The processing unit 1801 is further configured to determine an actual time domain window length according to the reporting strategy and the maximum duration length.

The processing unit 1801 is further configured to perform joint channel estimation processing according to the actual time domain window length.

In some examples, the processing unit 1801 is specifically configured to: determine the reporting strategy being that the terminal device does not report the maximum duration length; or, determine the reporting strategy being that the terminal device reports the maximum duration length.

In some examples, the processing unit 1801 is specifically configured to: determine the actual time domain window length according to the maximum duration length and a configured nominal time domain window length, the reporting strategy being that the terminal device does not report the maximum duration length.

In some examples, the processing unit 1801 is specifically configured to: take the configured nominal time domain window length as the actual time domain window length, where the configured nominal time domain window length is less than or equal to the maximum duration length; or, take the maximum duration length as the actual time domain window length, where the configured nominal time domain window length is greater than the maximum duration length.

In some examples, the processing unit 1801 is specifically configured to: determine the reporting strategy being that the terminal device periodically reports the maximum duration length; or, determine the reporting strategy being that the terminal device aperiodically reports the maximum duration length.

In some examples, the processing unit 1801 is specifically configured to:

periodically report the maximum duration length all the time; take, after a joint channel estimation mechanism is enabled, the nominal time domain window length as the actual time domain window length, where the terminal device receives the nominal time domain window length, the nominal time domain window length is determined based on the maximum duration length, and the nominal time domain window length is less than or equal to the maximum duration length; or, take the maximum duration length as the actual time domain window length, where the terminal device does not receive the nominal time domain window length; where the reporting strategy is that the terminal device periodically reports the maximum duration length all the time.

In some examples, the processing unit 1801 is specifically configured to: periodically report the maximum duration length after a joint channel estimation mechanism is enabled; and take the nominal time domain window length as the actual time domain window length, where the terminal device receives the nominal time domain window length sent by a network device, the nominal time domain window length is determined based on the maximum duration length, and the nominal time domain window length is less than or equal to the maximum duration length; or, take the maximum duration length as the actual time domain window length, where the terminal device does not receive the nominal time domain window length; where the reporting strategy is that the terminal device periodically reports the maximum duration length after the joint channel estimation mechanism is enabled.

In some examples, the processing unit 1801 is specifically configured to: aperiodically report the maximum duration length, where the maximum duration length is greater than or equal to the configured nominal time domain window length; and enable a joint channel estimation mechanism and take the configured nominal time domain window length as the actual time domain window length; where the reporting strategy is that the terminal device aperiodically reports the maximum duration length in response to determining that the maximum duration length is greater than or equal to the configured nominal time domain window length.

In some examples, the processing unit 1801 is specifically configured to: aperiodically report the maximum duration length, where the maximum duration length is less than the configured nominal time domain window length; disable a joint channel estimation mechanism; and re-enable, in response to receiving a reconfigured nominal time domain window length, the joint channel estimation mechanism, and take the reconfigured nominal time domain window length as the actual time domain window length, where the reconfigured nominal time domain window length is less than or equal to the maximum duration length; or, disable the joint channel estimation mechanism, take the maximum duration length as the actual time domain window length, and re-enable the joint channel estimation mechanism, where the terminal device does not receive the reconfigured nominal time domain window length; where the reporting strategy is that the terminal device aperiodically reports the maximum duration length in response to determining that the maximum duration length is less than the configured nominal time domain window length.

In some examples, the configured nominal time domain window length is configured according to at least one of the following modes: radio resource control (RRC) configuration information configuration; medium access control-control element (MAC-CE) configuration; downlink control information (DCI) configuration; or protocol configuration.

The joint channel estimation apparatus provided by the example of the disclosure determines the maximum duration length of the terminal device, determines the reporting strategy for the maximum duration length, determines the actual time domain window length according to the reporting strategy and the maximum duration length, and performs joint channel estimation processing according to the actual time domain window length. The actual time domain window length may be determined according to the maximum duration length of the terminal device and the reporting strategy, so that the terminal device may perform joint channel estimation processing according to the actual time domain window length.

Corresponding to the joint channel estimation methods provided by the examples from FIG. 12 to FIG. 17 above, the disclosure further provides a joint channel estimation apparatus. Because the joint channel estimation apparatus provided by the example of the disclosure corresponds to the joint channel estimation methods provided by the examples from FIG. 12 to FIG. 17 above, the implementation of the joint channel estimation methods is also applicable to the joint channel estimation apparatus provided by the example of the disclosure, which will not be described in detail in the example of the disclosure.

Figure 19:
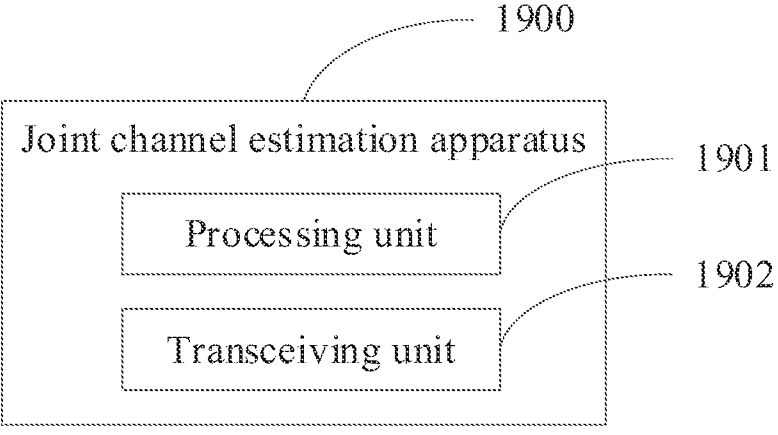
FIG. 19 is a schematic structural diagram of another joint channel estimation apparatus provided by an example of the disclosure.

FIG. 19 is a schematic structural diagram of another joint channel estimation apparatus provided by an example of the disclosure. The apparatus may be applied into a network device.

As shown in FIG. 19, the joint channel estimation apparatus 1900 may include: a processing unit 1901 and a transceiving unit 1902.

The processing unit 1901 is configured to determine configuration information for a terminal device.

The transceiving unit 1902 is configured to issue the configuration information to the terminal device.

In some examples, a reporting strategy for the terminal device to report a maximum duration length is not to report the maximum duration length, and the processing unit 1901 is specifically configured to: determine that the configuration information includes one or more of joint channel estimation enabling information and a nominal time domain window length.

In some examples, the processing unit 1901 is specifically configured to: determine that the configuration information includes one or more of joint channel estimation enabling information and a nominal time domain window length, where the nominal time domain window length is determined based on the maximum duration length, and the nominal time domain window length is less than or equal to the maximum duration length.

A reporting strategy for the terminal device to report the maximum duration length is to periodically report the maximum duration length all the time.

In some examples, the processing unit 1901 is specifically configured to: determine that the configuration information at least includes a nominal time domain window length, where the nominal time domain window length is determined based on the maximum duration length, and the nominal time domain window length is less than or equal to the maximum duration length.

A reporting strategy for the terminal device to report the maximum duration length is that the terminal device periodically reports the maximum duration length after a joint channel estimation mechanism is enabled.

In some examples, the processing unit 1901 is specifically configured to: determine that the configuration information includes a nominal time domain window length for determining an actual time domain window length.

A reporting strategy for the terminal device to report the maximum duration length is to aperiodically report the maximum duration length based on a condition that the maximum duration length is greater than or equal to the nominal time domain window length.

In some examples, the processing unit 1901 is specifically configured to: receive disabled joint channel estimation information; and redetermine the configuration information according to the maximum duration length reported by the terminal device, where the configuration information at least includes: a reconfigured nominal time domain window length and re-enabled joint channel estimation information, and the reconfigured nominal time domain window length is less than or equal to the maximum duration length.

A reporting strategy for the terminal device to report the maximum duration length is to aperiodically report the maximum duration length based on a condition that the maximum duration length is less than the configured nominal time domain window length.

According to the joint channel estimation apparatus in the example of the disclosure, the network device determines the configuration information for the terminal device and issues the configuration information to the terminal device, so that the terminal device may determine the actual time domain window length according to the configuration information and its corresponding maximum duration length, and may perform joint channel estimation processing according to the actual time domain window length.

In order to implement the above examples, the disclosure provides a communication device. The communication device includes a processor and a memory, the memory stores a computer program, and the processor executes the computer program stored in the memory to cause the communication device to execute the methods described by the examples from FIG. 1 to FIG. 11. For example, the communication device may be the terminal device in the above example.

In order to implement the above examples, the disclosure provides another communication device. The communication device includes a processor and a memory, the memory stores a computer program, and the processor executes the computer program stored in the memory to cause the communication device to execute the methods described by the examples from FIG. 12 to FIG. 17. For example, the communication device may be the network device in the above example.

In order to implement the above examples, the disclosure provides a communication apparatus. The communication apparatus includes: a processor and an interface circuit, the interface circuit is configured to receive code instructions and transmit code instructions to the processor; and the processor is configured to run the code instructions to execute the methods described by the examples from FIG. 1 to FIG. 11. For example, the communication apparatus may be the terminal device in the above example.

In order to implement the above examples, the disclosure provides another communication apparatus. The communication apparatus includes: a processor and an interface circuit, the interface circuit is configured to receive code instructions and transmit the code instructions to the processor; and the processor is configured to run the code instructions to execute the methods described by the examples from FIG. 12 to FIG. 17. For example, the communication apparatus may be the network device in the above example.

In order to implement the above examples, the disclosure provides a non-transitory computer-readable storage medium, used for storing instructions, the instructions, when executed, causing the method described by any example from FIG. 1 to FIG. 11 to be implemented.

In order to implement the above examples, the disclosure provides another non-transitory computer-readable storage medium, used for storing instructions, the instructions, when executed, causing the method described by any example from FIG. 12 to FIG. 17 to be implemented.

Figure 20:
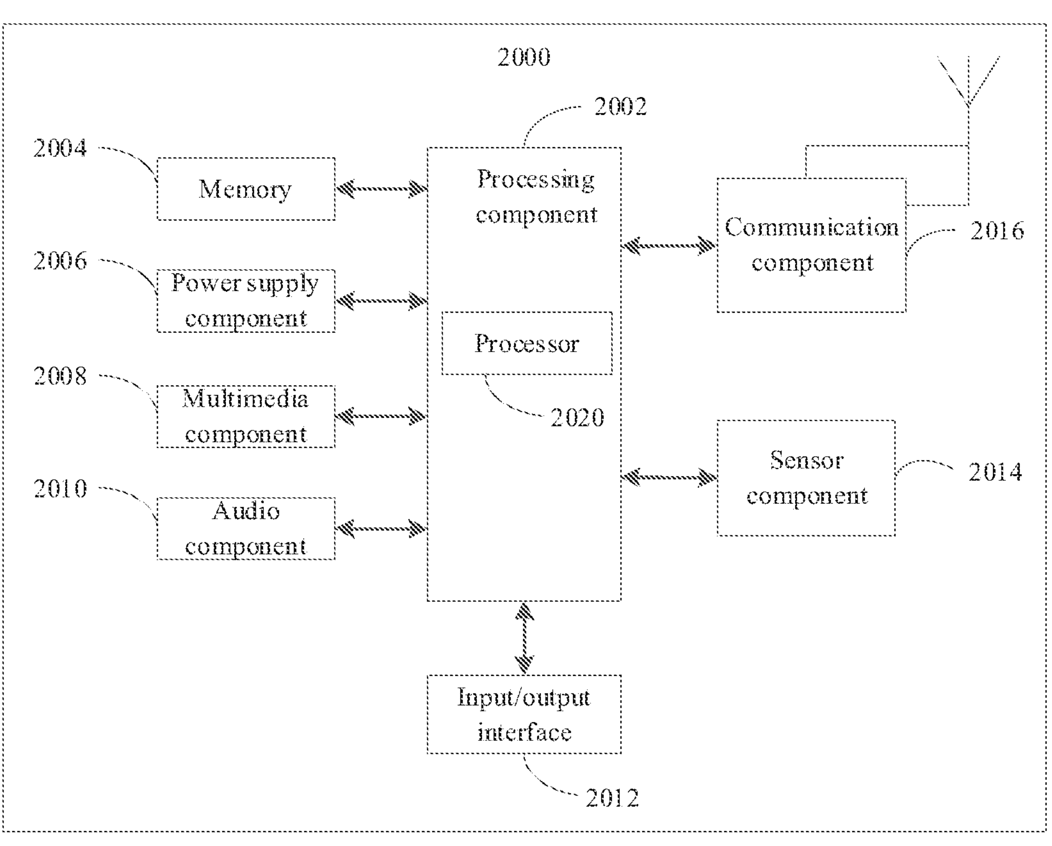
FIG. 20 is a block diagram of a terminal device provided by an example of the disclosure.

FIG. 20 is a block diagram of a terminal device provided by an example of the disclosure. For example, the terminal device 2000 may be a mobile telephone, a computer, digital broadcast user equipment, a message transceiving device, a game console, a tablet device, a medical device, a fitness device, a personal digital assistant, and the like.

Referring to FIG. 20, the terminal device 2000 may include at least one of the following components: a processing component 2002, a memory 2004, a power supply component 2006, a multimedia component 2008, an audio component 2010, an input/output (I/O) interface 2012, a sensor component 2014, and a communication component 2016.

The processing component 2002 usually controls overall operation of the terminal device 2000, such as operations associated with displaying, telephone calling, data communication, a camera operation and a record operation. The processing component 2002 may include at least one processor 2020 to execute instructions, so as to complete all or part of steps of the above method. In addition, the processing component 2002 may include at least one module, so as to facilitate interaction between the processing component 2002 and other components. For example, the processing component 2002 may include a multimedia module, so as to facilitate interaction between the multimedia component 2008 and the processing component 2002.

The memory 2004 is configured to store various types of data so as to support operations on the terminal device 2000. Examples of these data include instructions of any application program or method configured to be operated on the terminal device 2000, contact data, telephone directory data, messages, pictures, videos, and the like. The memory 2004 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 2006 provides electric power for various components of the terminal device 2000. The power supply component 2006 may include a power management system, at least one power source, and other components associated with generating, managing and distributing electric power for the terminal device 2000.

The multimedia component 2008 includes a screen providing an output interface between the terminal device 2000 and a user. In some examples, the screen may include a liquid crystal display (LCD) and a touch panel (TP). In response to determining that the screen includes the touch panel, the screen may be implemented as a touch screen so as to receive an input signal from the user. The touch panel includes at least one touch sensor to sense touching, swiping and gestures on the touch panel. The touch sensor may not only sense a boundary of a touching or swiping action, but also detect wake-up time and pressure related to the touching or swiping operation. In some examples, the multimedia component 2008 includes a front camera and/or a back camera. When the terminal device 2000 is in an operation mode, such as a shooting mode or a video mode, the front camera and/or the back camera may receive external multimedia data. Each front camera and each back camera may be a fixed optical lens system or have a focal length and optical zooming capability.

The audio component 2010 is configured to output and/or input an audio signal. For example, the audio component 2010 includes a microphone (MIC). When the terminal device 2000 is in the operation mode, such as a call mode, a recording mode or a speech recognition mode, the microphone is configured to receive an external audio signal. The received audio signal may be further stored in the memory 2004 or sent via the communication component 2016. In some examples, the audio component 2010 further includes a speaker for outputting the audio signal.

The I/O interface 2012 provides an interface between the processing component 2002 and a peripheral interface module, and the above peripheral interface module may be a keyboard, a click wheel, buttons, etc. These buttons may include but are not limited to: a home button, volume buttons, a start button and a lock button.

The sensor component 2014 includes at least one sensor for providing state evaluations of all aspects for the terminal device 2000. For example, the sensor component 2014 may detect an on/off state of the terminal device 2000 and relative positioning of components, for example, the components are a display and a keypad of the terminal device 2000. The sensor component 2014 may further detect position change of the terminal device 2000 or one component of the terminal device 2000, whether there is contact between the user and the terminal device 2000, azimuth or speed up/speed down of the terminal device 2000, and temperature change of the terminal device 2000. The sensor component 2014 may include a proximity sensor, which is configured to detect existence of a nearby object without any physical contact. The sensor component 2014 may further include an optical sensor, such as a CMOS or CCD image sensor, for use in an imaging application. In some examples, the sensor component 2014 may further include an acceleration sensor, a gyroscope sensor, a magnetic sensor, a pressure sensor or a temperature sensor.

The communication component 2016 is configured to facilitate wired or wireless communication between the terminal device 2000 and other devices. The terminal device 2000 may access into a wireless network based on a communication standard, such as WiFi, 2G or 3G, or their combination. In one example, the communication component 2016 receives a broadcast signal or broadcast related information from an external broadcast management system via a broadcast channel. In one example, the communication component 2016 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the terminal device 2000 may be implemented by at least one application specific integrated circuit (ASIC), digital signal processor (DSP), digital signal processing device (DSPD), programmable logic device (PLD), field-programmable gate array (FPGA), controller, microcontroller, microprocessor or other electronic elements for executing the method shown in any one from FIG. 3 to FIG. 9 above.

In the example, a non-transitory computer readable storage medium including instructions is further provided, such as a memory 2004 including instructions. The above instructions may be executed by a processor 2020 of the terminal device 2000 so as to complete the method shown in any one from FIG. 1 to FIG. 11. For example, the non-transitory computer readable storage medium may be an ROM, a random access memory (RAM), a CD-ROM, a magnetic tape, a floppy disk, an optical data storage device and the like.

Figure 21:
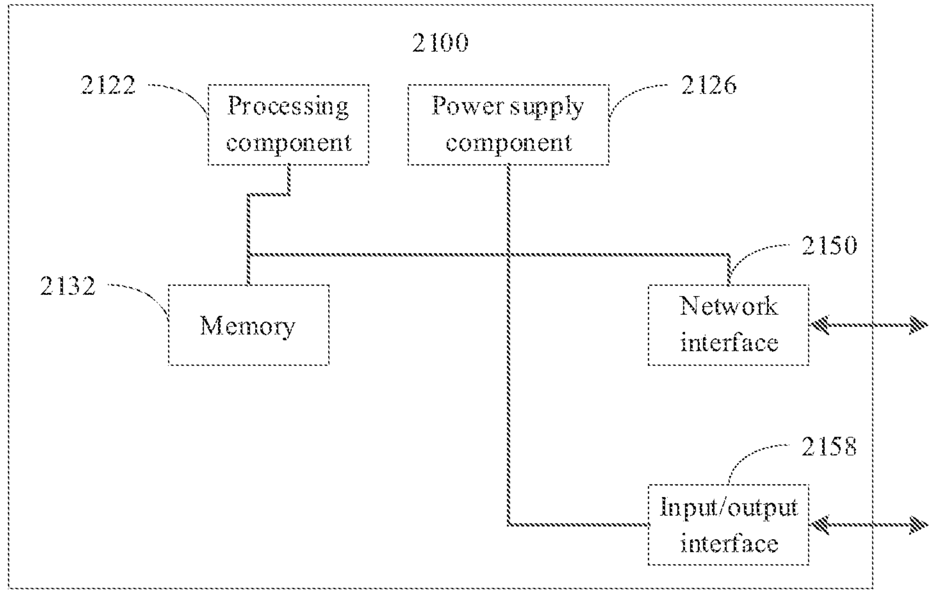
FIG. 21 is a schematic structural diagram of a network device provided by an example of the disclosure.

As shown in FIG. 21, FIG. 21 is a schematic structural diagram of a network device provided by an example of the disclosure. Referring to FIG. 21, the network device 2100 includes a processing component 2122, which further includes at least one processor, and a memory resource represented by a memory 2132, for storing instructions executable by the processing component 2122, such as an application program. The application program stored in the memory 2132 may include one or more modules with each corresponding to a set of instructions. In addition, the processing component 2122 is configured to execute the instructions so as to execute any of the aforementioned methods applied to the network device, for example, the method shown by any one from FIG. 12 to FIG. 17.

The network device 2100 may further include a power supply component 2126 configured to execute power supply management of the network device 2100, a wired or wireless network interface 2150 configured to connect the network device 2100 to a network, and an input/output (I/O) interface 2158. The network device 2100 may operate based on an operating system stored in the memory 2132, such as Windows Server™, Mac OS X™, Unix™, Linux™, FreeBSD™ or the like.

Those of skill in the art will easily figure out other implementation solutions of the disclosure after considering the specification and practicing the disclosure disclosed here. The disclosure intends to cover any transformation, usage or adaptive change of the disclosure, and these transformations, usages or adaptive changes conform to a general principle of the disclosure and include common general knowledge or conventional technical means which are not disclosed here in the technical field. The specification and the examples are regarded as being for example.

It is to be understood that the disclosure is not limited to the exact structure that has been described above and shown in the accompanying drawings, and that various modifications and changes may be made without departing from the scope of the disclosure. The scope of the disclosure is limited by the appended claims.

In order to implement the above examples, an example of the disclosure further provides a communication apparatus. The communication apparatus may be a network device, may also be a terminal device, may also be a chip, chip system, or processor that supports the network device to implement the methods above, and may further be a chip, chip system, or processor that supports the terminal device to implement the methods above. This apparatus may be used for implementing the method described in any of the above method examples, which may specifically refer to illustration in the above method examples.

The communication apparatus may include one or more processors. The processor may be a general-purpose processor or a dedicated processor. For example, it may be a baseband processor or a central processor. The baseband processor may be used for processing a communication protocol and communication data, while the central processor may be used for controlling the communication apparatus (such as a base station, a baseband chip, a terminal device, a terminal device chip, and a DU or CU), executing a computer program, and processing data from the computer program.

In some examples, the communication apparatus may further include one or more memories on which the computer programs can be stored, and the processor executes the computer program to cause the communication apparatus to execute the methods described in the above method examples. In some examples, the memory may further store data. The communication apparatus and the memory may be arranged separately or integrated together.

In some examples, the communication apparatus may further include a transceiver and an antenna. The transceiver may be referred to as a transceiving unit, a transceiving machine, or a transceiving circuit, etc., used for achieving a transceiving function. The transceiver may include a receiver and a transmitter, and the receiver may be referred to as a receiving machine or a receiving circuit, for achieving a reception function; and the transmitter may be referred to as a transmitting machine or a transmitting circuit, for achieving a transmitting function.

In some examples, the communication apparatus may further include one or more interface circuits. The interface circuit is used for receiving code instructions and transmitting the code instructions to the processor. The processor runs the code instructions to cause the communication apparatus to execute the method described in any of the above method examples.

In one implementation, the processor may include a transceiver for implementing reception and transmitting functions. For example, the transceiver may be a transceiving circuit, an interface, or an interface circuit. The transceiving circuit, interface, or interface circuit used for achieving the receiving and transmitting functions may be separate or integrated together. The above transceiving circuit, interface, or interface circuit can be used for reading and writing codes/data, or the above transceiving circuit, interface, or interface circuit may be used for signal transmission or transferring.

In one implementation, the processor may store a computer program, the computer program runs on the processor, to cause the communication apparatus to execute the method described in any of the above method examples. The computer program may be embedded in the processor, in which case the processor may be implemented by hardware.

In one implementation, the communication apparatus may include a circuit, and the circuit may achieve the functions of transmitting, receiving, or communicating in the aforementioned method examples. The processor and transceiver described in the disclosure may be implemented on an integrated circuit (IC), an analog IC, a radio frequency integrated circuit (RFIC), a mixed signal IC, an application specific integrated circuit (ASIC), a printed circuit board (PCB), an electronic device, and the like. The processor and transceiver may also be manufactured using various IC process technologies, such as a complementary metal oxide semiconductor (CMOS), an N-Metal-oxide-semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The communication apparatus described in the above examples may be a network device or a terminal device, but the scope of the communication apparatus described in the disclosure is not limited to this. The communication apparatus may be an independent device or may be part of a larger device. For example, the communication apparatus may be:

(1) an independent integrated circuit (IC), or a chip, or a chip system or a subsystem;

(2) a set of one or more ICs, alternatively, the IC set including a storage component for storing data and a computer program;

(3) an ASIC, such as a modem;

(4) a module that can be embedded in other devices;

(5) a receiving machine, a terminal device, an intelligent terminal device, a cellular phone, a wireless device, a handheld machine, a mobile unit, an on-board device, a network device, a cloud device, an artificial intelligence devices, etc.; and (6) others and so on.

In a case that the communication apparatus may be the chip or chip system, the chip may include the processor and the interface. The number of the processor may be one or more, and the number of the interfaces may be multiple.

In some examples, the chip further includes a memory, and the memory is used for storing the necessary computer program and data.

Those skilled in the art can further understand that the various illustrative logical blocks and steps listed in the example of the disclosure may be implemented through electronic hardware, computer software, or a combination of the two. Whether such functions are implemented through hardware or software depends on the design requirements of the specific application and the overall system. Those skilled in the art can use various methods to achieve the described functions for each specific application, but such implementation should not be understood as exceeding the scope of protection of the example of the disclosure.

The disclosure further provides a non-transitory readable storage medium on which instructions are stored, and the instructions, when executed by a computer, implement the functions of any of the above method examples.

The disclosure further provides a computer program product, and the computer program product, when executed by a computer, implements the functions of any of the above method examples.

In the above examples, it can be fully or partially implemented through software, hardware, firmware, or any combination of them. When implemented using the software, it can be fully or partially implemented in a form of the computer program product. The computer program product includes one or more computer programs. When loading and executing the computer program on the computer, processes or functions described in the example of the disclosure are fully or partially generated. The computer may be a general-purpose computer, a dedicated computer, a computer network, or other programmable apparatuses. The computer program may be stored in a non-transitory computer-readable storage medium or transmitted from one non-transitory computer-readable storage medium to another. For example, the computer program may be transmitted from a website, a computer, a server or a data center to another website, computer, server, or data center through a wired (such as a coaxial cable, an optical fiber, a digital subscriber line (DSL)) or wireless (such as infrared, wireless, and microwave) mode. The non-transitory computer-readable storage medium may be any available medium that the computer can access, or a data storage device such as a server or a data center that is integrated by one or more available medium. The available medium may be a magnetic medium (such as a floppy disk, a hard drive, and a magnetic tape), an optical medium (such as a high-density digital video disc (DVD)), or a semiconductor medium (such as a solid state disk (SSD)), etc.

Those ordinarily skilled in the art can understand that the first, second, and other numerical numbers involved in the disclosure are differentiation for the convenience of description, and are not intended to limit the scope of the example of the disclosure, but also not to indicate the sequential order.

At least one in the disclosure can further be described as one or more, and a plurality of may be two, three, four, or more, which is not limited in the disclosure. In the example of the disclosure, for a technical feature, the technical features described in the technical feature are distinguished by "first", "second", "third", "A", "B", "C", and "D", and the technical features described by "first", "second", "third", "A", "B", "C", and "D" have no sequential order or order of size.

The corresponding relationships shown in tables in the disclosure can be configured or predefined. Values of information in each table are examples and can be configured as other values, which is not limited in the disclosure. When configuring the corresponding relationships between the information and various parameters, it does not need to configure all the corresponding relationships shown in each table. For example, in the tables in the disclosure, the corresponding relationships shown in certain rows may not be configured. For another example, appropriate deformation and adjustments, such as splitting and merging, can be made based on the above tables. The names of parameters shown in titles of the above tables may also use other names that can be understood by the communication apparatus, and the values or representations of the parameters may also be other values or representations understood by the communication apparatus. When implementing the above tables, other data structures may also be used, such as an array, a queue, a container, a stack, a linear table, a pointer, a linked list, a tree, a graph, a structure, a class, a heap, a hashing table, or a hash table.

The predefinition in the disclosure may be understood as being defined, pre-defined, stored, pre-stored, pre-negotiated, pre-configured, cured, or pre-fired.

Those ordinarily skilled in the art may realize that, units and algorithm steps of the examples described in the disclosed examples here can be implemented by electronic hardware, or a combination of computer software and the electronic hardware. Whether these functions are executed in a mode of hardware or software depends on particular applications and design constraint conditions of the technical solutions. Professional technicians may use different methods to implement the described functions for each particular application, but such implementation is not to be regarded beyond the scope of the disclosure.

Those skilled in the art can clearly understand that, for the convenience and simplicity of description, the specific working process of the above described system, apparatus and unit may refer to the corresponding process in the aforementioned method examples, and will not be repeated here.

The above is a specific implementation of the disclosure, but the scope of protection of the disclosure is not limited to this. Any changes or replacements that can be easily thought of by technical personnel familiar with the technical field within the technical scope disclosed in the disclosure need to be covered within the scope of protection of the disclosure. The protection scope of the disclosure needs to be subjected to the scope of protection of the claims.

The invention claimed is:

1. A joint channel estimation method, executed by a terminal device, and comprising:

determining a maximum duration length of the terminal device;

determining a reporting strategy for the maximum duration length;

determining an actual time domain window length according to the reporting strategy and the maximum duration length; and performing joint channel estimation processing according to the actual time domain window length;

wherein determining the reporting strategy for the maximum duration length comprises one of the following:

determining the reporting strategy being that the terminal device does not report the maximum duration length;

determining the reporting strategy being that the terminal device periodically reports the maximum duration length; or determining the reporting strategy being that the terminal device aperiodically reports the maximum duration length;

wherein determining the actual time domain window length according to the reporting strategy and the maximum duration length comprises one of the following:

periodically reporting the maximum duration length all the time; and taking, after a joint channel estimation mechanism is enabled, a nominal time domain window length as the actual time domain window length, wherein the terminal device receives the nominal time domain window length, the nominal time domain window length is determined based on the maximum duration length, and the nominal time domain window length is less than or equal to the maximum duration length; or taking the maximum duration length as the actual time domain window length, wherein the terminal device does not receive the nominal time domain window length; wherein the reporting strategy is that the terminal device periodically reports the maximum duration length all the time;

or periodically reporting the maximum duration length after the joint channel estimation mechanism is enabled; and taking the nominal time domain window length as the actual time domain window length, wherein the terminal device receives the nominal time domain window length sent by a network device, the nominal time domain window length is determined based on the maximum duration length, and the nominal time domain window length is less than or equal to the maximum duration length; or taking the maximum duration length as the actual time domain window length, wherein the terminal device does not receive the nominal time domain window length; wherein the reporting strategy is that the terminal device periodically reports the maximum duration length after the joint channel estimation mechanism is enabled;

or aperiodically reporting the maximum duration length, wherein the maximum duration length is less than a configured nominal time domain window length; and disabling the joint channel estimation mechanism, re-enabling, in response to receiving a reconfigured nominal time domain window length, the joint channel estimation mechanism, and taking the reconfigured nominal time domain window length as the actual time domain window length, wherein the reconfigured nominal time domain window length is less than or equal to the maximum duration length; or disabling the joint channel estimation mechanism, taking the maximum duration length as the actual time domain window length, and re-enabling the joint channel estimation mechanism, wherein the terminal device does not receive the reconfigured nominal time domain window length; wherein the reporting strategy is that the terminal device aperiodically reports the maximum duration length in response to determining that the maximum duration length is less than the configured nominal time domain window length.

2. A communication apparatus, comprising: a processor and an interface circuit, wherein the interface circuit is configured to receive code instructions and transmit the code instructions to the processor; and the processor is configured to run the code instructions to execute the joint channel estimation method according to claim 1.

3. A non-transitory computer-readable storage medium, used for storing instructions, the instructions, when executed, causing the joint channel estimation method according to claim 1 to be implemented.

4. A joint channel estimation method, executed by a network device, and comprising:

determining configuration information for a terminal device; and issuing the configuration information to the terminal device;

wherein the configuration information is used by the terminal device to determine an actual time domain window length according to the configuration information and a maximum duration length of the terminal device;

wherein a reporting strategy for the terminal device to report the maximum duration length comprises one of the following:

the terminal device not reporting the maximum duration length;

the terminal device periodically reporting the maximum duration length; or the terminal device aperiodically reporting the maximum duration length;

wherein the actual time domain window length is determined by the terminal device in one of the following manners:

the terminal device periodically reports the maximum duration length all the time; and takes, after a joint channel estimation mechanism is enabled, a nominal time domain window length as the actual time domain window length, wherein the terminal device receives the nominal time domain window length, the nominal time domain window length is determined based on the maximum duration length, and the nominal time domain window length is less than or equal to the maximum duration length; or takes the maximum duration length as the actual time domain window length, wherein the terminal device does not receive the nominal time domain window length; wherein the reporting strategy is that the terminal device periodically reports the maximum duration length all the time;

or the terminal device periodically reports the maximum duration length after the joint channel estimation mechanism is enabled; and takes the nominal time domain window length as the actual time domain window length, wherein the terminal device receives the nominal time domain window length sent by a network device, the nominal time domain window length is determined based on the maximum duration length, and the nominal time domain window length is less than or equal to the maximum duration length; or takes the maximum duration length as the actual time domain window length, wherein the terminal device does not receive the nominal time domain window length; wherein the reporting strategy is that the terminal device periodically reports the maximum duration length after the joint channel estimation mechanism is enabled;

or the terminal device aperiodically reports the maximum duration length, wherein the maximum duration length is less than a configured nominal time domain window length; and disables the joint channel estimation mechanism, re-enables, in response to receiving a reconfigured nominal time domain window length, the joint channel estimation mechanism, and takes the reconfigured nominal time domain window length as the actual time domain window length, wherein the reconfigured nominal time domain window length is less than or equal to the maximum duration length; or disables the joint channel estimation mechanism, takes the maximum duration length as the actual time domain window length, and re-enables the joint channel estimation mechanism, wherein the terminal device does not receive the reconfigured nominal time domain window length; wherein the reporting strategy is that the terminal device aperiodically reports the maximum duration length in response to determining that the maximum duration length is less than the configured nominal time domain window length.

5. The joint channel estimation method according to claim 4, wherein determining the configuration information for the terminal device at least comprises:

determining that the configuration information comprises one or more of joint channel estimation enabling information and the nominal time domain window length.

6. The joint channel estimation method according to claim 4, wherein determining the configuration information for the terminal device at least comprises:

determining that the configuration information comprises one or more of joint channel estimation enabling information and the nominal time domain window length, wherein the nominal time domain window length is determined based on the maximum duration length, and the nominal time domain window length is less than or equal to the maximum duration length.

7. The joint channel estimation method according to claim 4, wherein determining the configuration information for the terminal device comprises:

determining that the configuration information at least comprises the nominal time domain window length, wherein the nominal time domain window length is determined based on the maximum duration length, and the nominal time domain window length is less than or equal to the maximum duration length.

8. The joint channel estimation method according to claim 4, wherein determining the configuration information for the terminal device comprises:

determining that the configuration information comprises the nominal time domain window length for determining the actual time domain window length.

9. The joint channel estimation method according to claim 4, wherein determining the configuration information for the terminal device comprises:

receiving disabled joint channel estimation information; and redetermining the configuration information according to the maximum duration length reported by the terminal device, wherein the configuration information at least comprises: the reconfigured nominal time domain window length and re-enabled joint channel estimation information, and the reconfigured nominal time domain window length is less than or equal to the maximum duration length.

10. A communication device, comprising a processor and a memory, wherein the memory stores a computer program, and the processor executes the computer program stored in the memory to cause the communication device to execute the joint channel estimation method according to claim 4.

11. A communication device, comprising a processor and a memory, wherein the memory stores a computer program, and the processor executes the computer program stored in the memory to cause the communication device to execute the following:

determining a maximum duration length of the communication device;

determining a reporting strategy for the maximum duration length;

determining an actual time domain window length according to the reporting strategy and the maximum duration length; and performing joint channel estimation processing according to the actual time domain window length;

wherein determining the reporting strategy for the maximum duration length comprises one of the following:

determining the reporting strategy being that the communication device does not report the maximum duration length;

determining the reporting strategy being that the communication device periodically reports the maximum duration length; or determining the reporting strategy being that the communication device aperiodically reports the maximum duration length;

wherein determining the actual time domain window length according to the reporting strategy and the maximum duration length comprises one of the following:

periodically reporting the maximum duration length all the time; and taking, after a joint channel estimation mechanism is enabled, a nominal time domain window length as the actual time domain window length, wherein the communication device receives the nominal time domain window length, the nominal time domain window length is determined based on the maximum duration length, and the nominal time domain window length is less than or equal to the maximum duration length; or taking the maximum duration length as the actual time domain window length, wherein the communication device does not receive the nominal time domain window length; wherein the reporting strategy is that the communication device periodically reports the maximum duration length all the time;

or periodically reporting the maximum duration length after the joint channel estimation mechanism is enabled; and taking the nominal time domain window length as the actual time domain window length, wherein the communication device receives the nominal time domain window length sent by a network device, the nominal time domain window length is determined based on the maximum duration length, and the nominal time domain window length is less than or equal to the maximum duration length; or taking the maximum duration length as the actual time domain window length, wherein the communication device does not receive the nominal time domain window length; wherein the reporting strategy is that the communication device periodically reports the maximum duration length after the joint channel estimation mechanism is enabled;

or aperiodically reporting the maximum duration length, wherein the maximum duration length is less than a configured nominal time domain window length; and disabling the joint channel estimation mechanism, re-enabling, in response to receiving a reconfigured nominal time domain window length, the joint channel estimation mechanism, and taking the reconfigured nominal time domain window length as the actual time domain window length, wherein the reconfigured nominal time domain window length is less than or equal to the maximum duration length; or disabling the joint channel estimation mechanism, taking the maximum duration length as the actual time domain window length, and re-enabling the joint channel estimation mechanism, wherein the communication device does not receive the reconfigured nominal time domain window length; wherein the reporting strategy is that the communication device aperiodically reports the maximum duration length in response to determining that the maximum duration length is less than the configured nominal time domain window length.

* * * * *